United States Patent
Yeom et al.

(10) Patent No.: US 10,616,634 B2
(45) Date of Patent: Apr. 7, 2020

(54) DISPLAY DEVICE AND OPERATING METHOD OF A DISPLAY DEVICE

(71) Applicant: LG ELECTRONICS INC., Seoul (KR)

(72) Inventors: Jungho Yeom, Seoul (KR); Youngwoo Kim, Seoul (KR); Eunju Lee, Seoul (KR); Kihyung Kim, Seoul (KR); Myongsun Kim, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/236,517

(22) Filed: Aug. 15, 2016

(65) Prior Publication Data
US 2017/0085938 A1    Mar. 23, 2017

(30) Foreign Application Priority Data
Sep. 22, 2015 (KR) .................. 10-2015-0133921

(51) Int. Cl.
*H04N 21/433* (2011.01)
*G06F 3/147* (2006.01)
(Continued)

(52) U.S. Cl.
CPC ......... *H04N 21/4126* (2013.01); *H04L 67/22* (2013.01); *H04N 21/4122* (2013.01); *H04N 21/431* (2013.01); *H04N 21/4363* (2013.01); *H04N 21/43615* (2013.01); *H04N 21/43632* (2013.01); *H04N 21/43637* (2013.01); *H04N 21/44204* (2013.01); *H04N 21/44222* (2013.01);
(Continued)

(58) Field of Classification Search
None
See application file for complete search history.

(56) References Cited

U.S. PATENT DOCUMENTS 6,658,417 B1 * 12/2003 Stakutis ............ G06F 17/30067
9,037,908 B1 *  5/2015 Rhu ................. H04N 21/41422
                                                        714/25
(Continued)

FOREIGN PATENT DOCUMENTS

| CN | 101406058 | 4/2009 | |
|---|---|---|---|
| EP | 2 704 461 | 3/2014 | |
| EP | 2704461 A1 * | 3/2014 | ............ H04W 4/206 |

OTHER PUBLICATIONS

European Search Report dated Jan. 11, 2017 issued in Application No. 16001916.2.
(Continued)

*Primary Examiner* — Nasser M Goodarzi
*Assistant Examiner* — Terrika Peterson
(74) *Attorney, Agent, or Firm* — KED & Associates, LLP

(57) ABSTRACT

An operating method of a display device includes displaying an external input list including a plurality of external input items; receiving a first request for selecting an external input item for screen mirroring from the plurality of external input items; and displaying a mirroring item including at least one of information on an external device that performs a screen mirroring function previously with the display device and information on a content provided through the external device according to the received first request.

19 Claims, 23 Drawing Sheets

(51) Int. Cl.
*H04N 21/41* (2011.01)
*H04L 29/08* (2006.01)
*H04N 21/431* (2011.01)
*H04N 21/643* (2011.01)
*H04N 21/472* (2011.01)
*H04N 21/4363* (2011.01)
*H04N 21/442* (2011.01)
*H04N 21/436* (2011.01)
*G06F 11/26* (2006.01)
*H04L 29/06* (2006.01)

(52) U.S. Cl.
CPC . *H04N 21/47217* (2013.01); *H04N 21/64322* (2013.01); *H04L 65/4076* (2013.01)

(56) References Cited

U.S. PATENT DOCUMENTS

| | | | |
|---|---|---|---|
| 9,706,237 B2* | 7/2017 | Chen | H04N 21/26258 |
| 9,928,151 B1* | 3/2018 | Rodriguez Valadez | G06F 11/26 |
| 2003/0095524 A1* | 5/2003 | Stephens | H04L 29/06 370/338 |
| 2003/0229900 A1* | 12/2003 | Reisman | G06F 17/30873 725/87 |
| 2006/0123131 A1* | 6/2006 | Almaula | H04L 65/4092 709/231 |
| 2007/0047902 A1 | 3/2007 | Ito et al. | |
| 2007/0047909 A1 | 3/2007 | Toyama et al. | |
| 2007/0124331 A1* | 5/2007 | Griffin | G06F 17/30017 |
| 2007/0198654 A1 | 8/2007 | Matsuoka | |
| 2008/0031595 A1* | 2/2008 | Cho | G11B 27/34 386/278 |
| 2009/0300231 A1 | 12/2009 | Munetsugu | |
| 2010/0027966 A1* | 2/2010 | Harrang | H04N 5/775 386/241 |
| 2010/0185775 A1* | 7/2010 | Lee | H04L 12/2838 709/231 |
| 2011/0276801 A1* | 11/2011 | Pang | H04N 21/2396 713/168 |
| 2012/0060109 A1* | 3/2012 | Han | G06F 3/1454 715/769 |
| 2014/0091987 A1* | 4/2014 | Lee | H04L 65/00 345/2.3 |
| 2014/0201632 A1* | 7/2014 | Kunigita | H04N 21/4667 715/716 |
| 2015/0065111 A1* | 3/2015 | Kobayashi | G06F 9/445 455/418 |
| 2015/0067819 A1* | 3/2015 | Shribman | H04L 67/06 726/12 |
| 2015/0135206 A1* | 5/2015 | Reisman | H04N 21/26283 725/18 |
| 2015/0312300 A1* | 10/2015 | Mosko | H04L 63/164 713/171 |
| 2016/0088351 A1* | 3/2016 | Petruzzelli | H04N 21/4334 725/23 |
| 2016/0094648 A1* | 3/2016 | Han | H04W 76/02 709/209 |
| 2016/0110151 A1* | 4/2016 | Isonishi | G06F 3/1454 345/2.2 |
| 2016/0381090 A1* | 12/2016 | Plazinkiy | H04L 65/403 715/753 |

OTHER PUBLICATIONS

European Office Action dated Jun. 20, 2017 issued in Application No. 16 001 916.2.
Chinese Office Action dated Apr. 3, 2019 issued in CN Application No. 201610843044.X.

* cited by examiner

FIG. 8
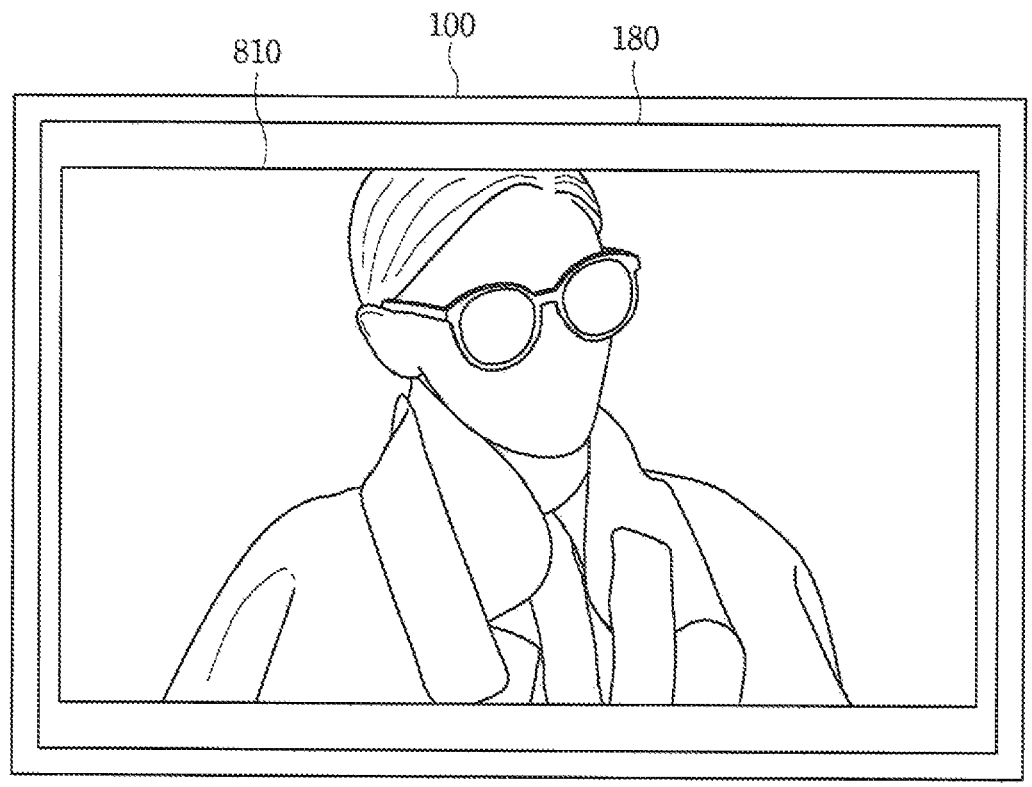
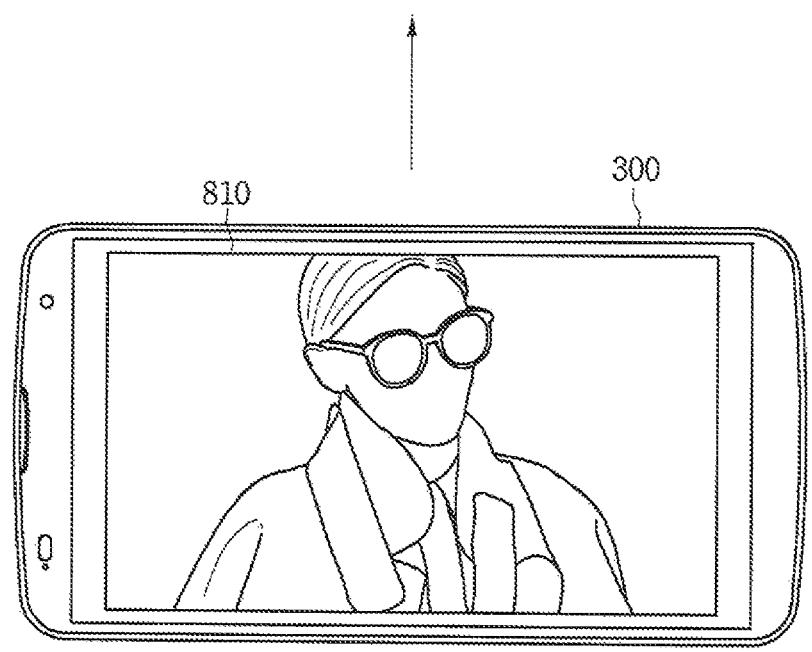

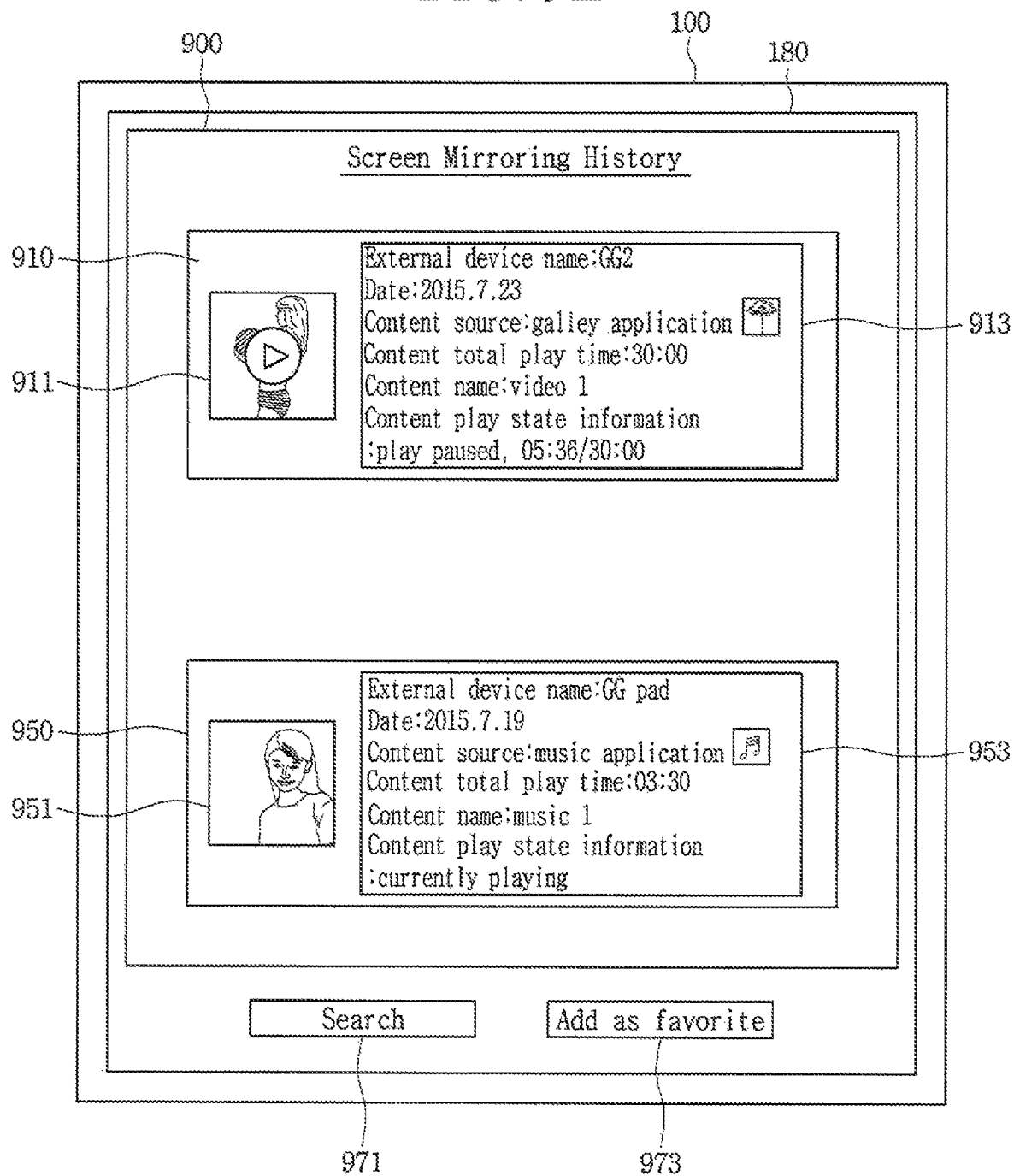

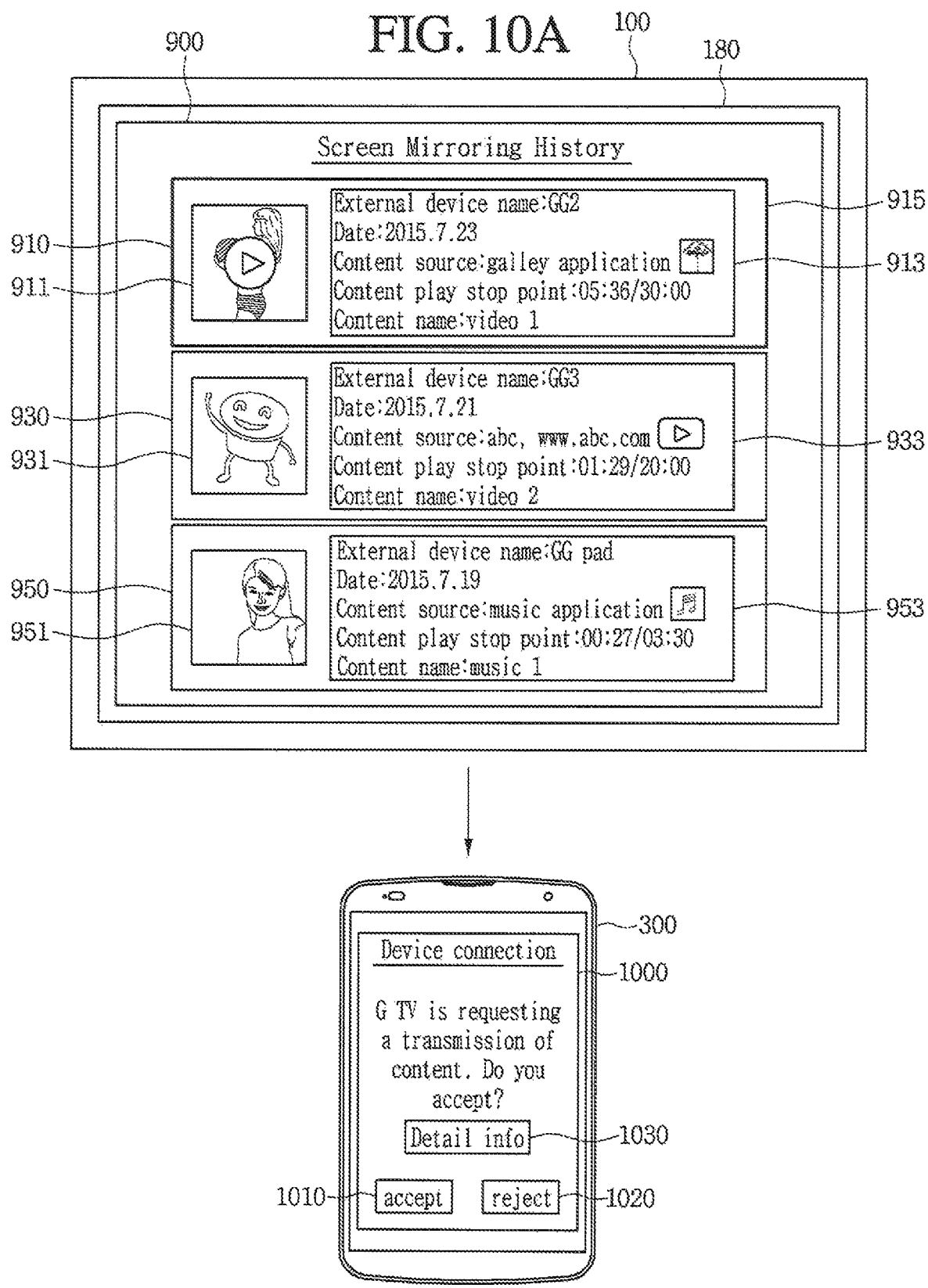

FIG. 12
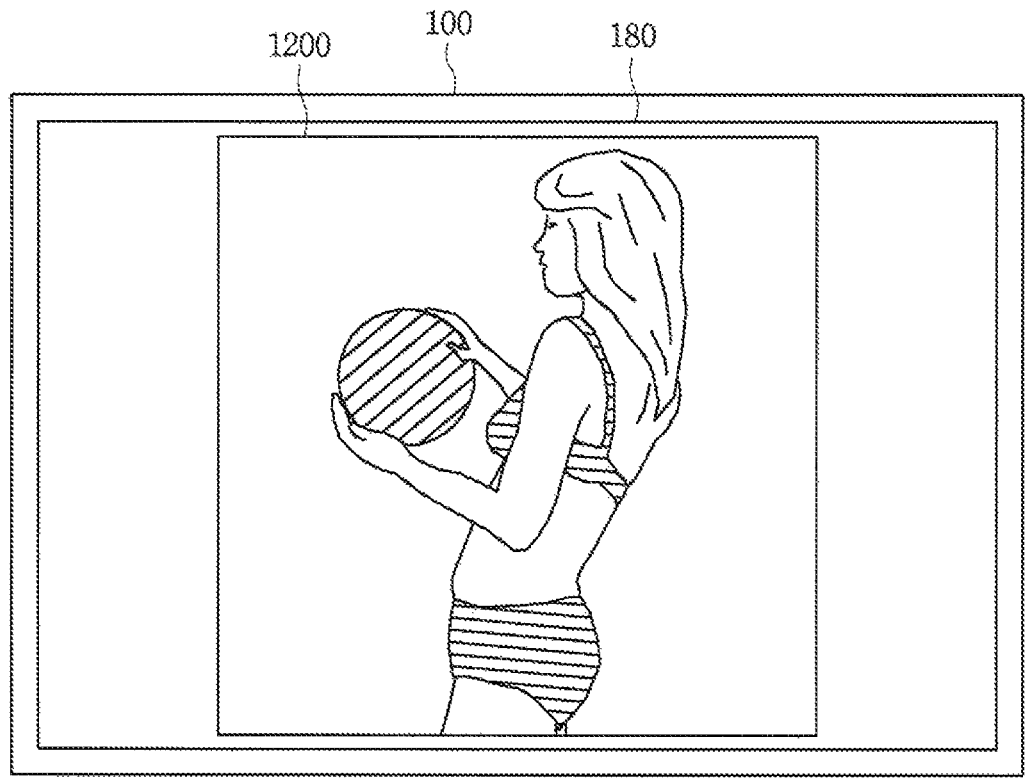
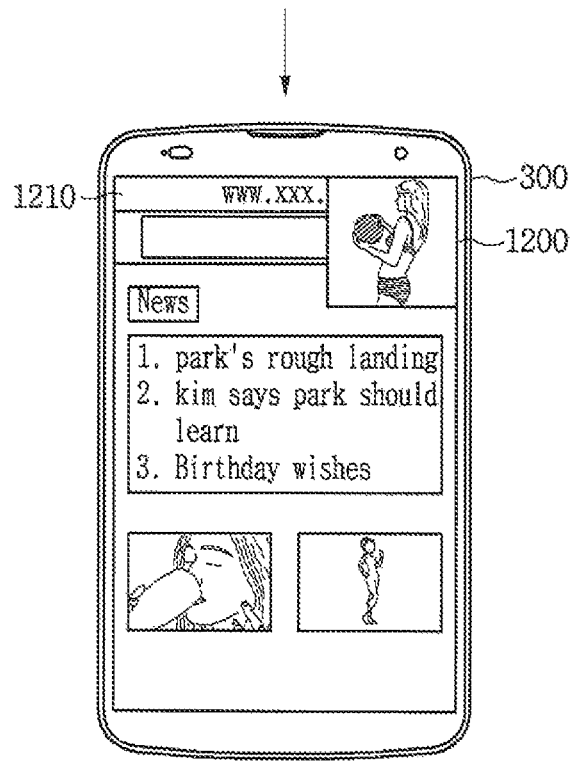

DISPLAY DEVICE AND OPERATING METHOD OF A DISPLAY DEVICE

CROSS-REFERENCE TO RELATED APPLICATION(S)

This application claims the benefit of Korean Patent Application No. 10-2015-0133921, filed on Sep. 22, 2015, which is hereby incorporated by reference in its entirety into this application.

BACKGROUND

1. Field

The present disclosure relates to a display device and an operating method of a display device, and particularly, to providing a history of screen mirroring previously performed with a display device.

2. Background

Digital TV services using wired or wireless communication networks are becoming common. The digital TV services may provide various services that conventional analog broadcasting services cannot provide.

For example, internet Protocol Television (IPTV) and smart TV services or types of digital TV services provide interactivity that allows users to actively select the types, watching times, and so on of watching programs. The IPTV and smart TV services may provide various additional services, for example, internet search, home shopping, and online game, based on such interactivity.

Screen mirroring techniques for viewing content being played by a terminal through a TV may be greatly used. However, information on a terminal that has previously performed screen mirroring with a TV and content shared by a terminal cannot be provided.

BRIEF DESCRIPTION OF THE DRAWINGS

The embodiments will be described in detail with reference to the following drawings in which like reference numerals refer to like elements, and wherein:

FIGS. 6 to 8 illustrate a process for performing screen mirroring between a display device and a mobile terminal;

FIGS. 9A to 9E illustrate at least one external device that performs screen mirroring with a display device previously according to a request for providing a mirroring history and Information on a content mirrored through each external device;

FIG. 10A to FIG. 12 illustrate a process for performing screen mirroring by transmitting a content transmission request to an external device corresponding to a selected mirroring item;

DETAILED DESCRIPTION

Figure 1:
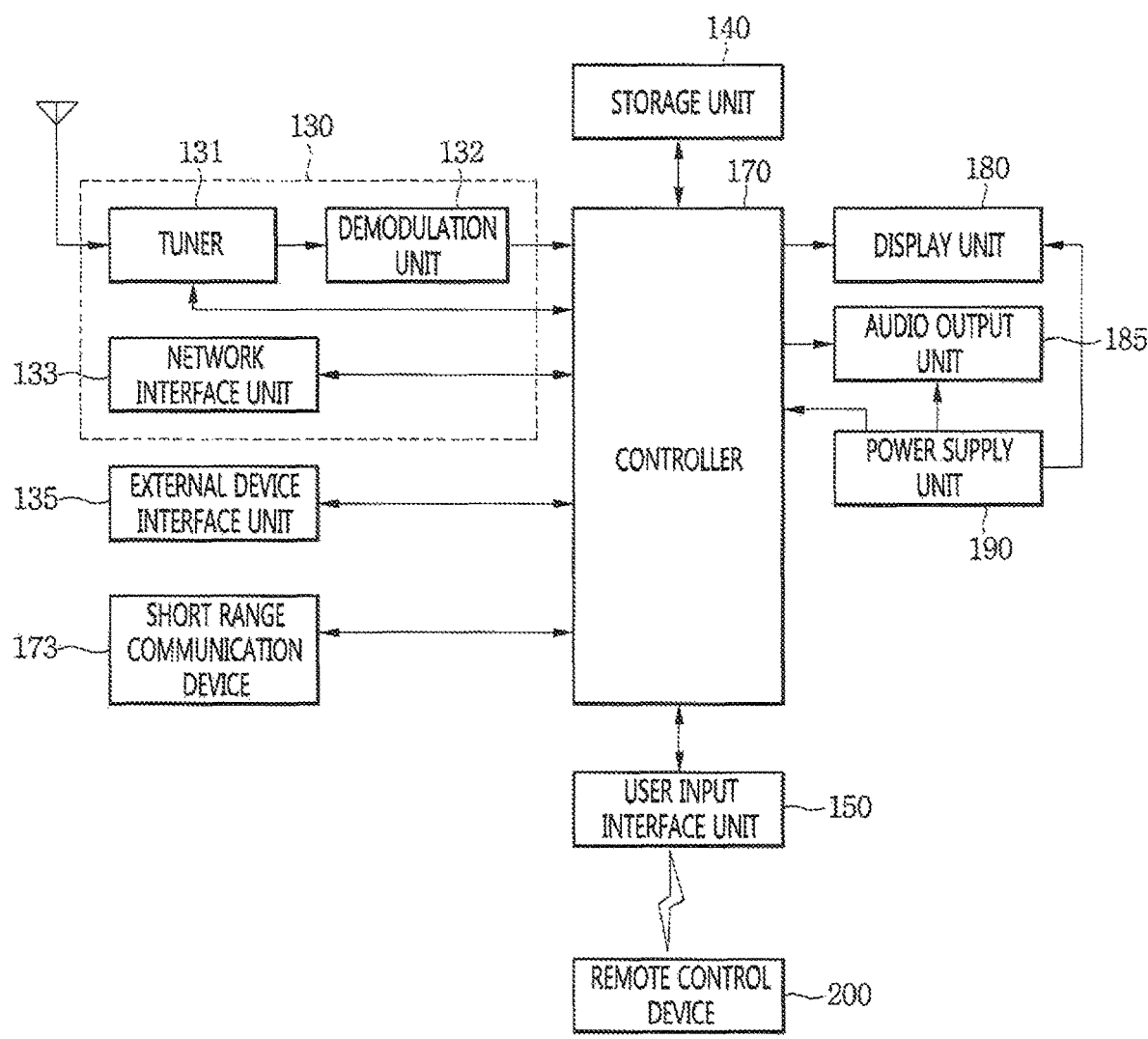
FIG. 1 is a block diagram illustrating a configuration of a display device according to an embodiment.

Referring to FIG. 1, a display device 100 may include a broadcast reception unit or device 130, an external device interface unit (or external device interface) 135, a storage unit (or memory) 140, a user input interface unit (or user input interface) 150, a control unit (or controller) 170, a short-range communication unit or device 173, a display unit (or display) 180, an audio output unit (or audio output) 185, and a power supply unit (or power supply) 190. The broadcast reception unit 130 may include a tuner 131, a demodulation unit (or demodulator) 132, and a network interface unit (or network interface) 133.

The tuner 131 may select a specific broadcast channel according to a channel selection command. The tuner 131 may receive broadcast signals for the selected specific broadcast channel. The demodulation unit 132 may divide the received broadcast signals into video signals, audio signals, and broadcast program related data signals and restore the divided video signals, audio signals, and data signals to an output available form.

The external device interface unit 135 may receive an application or an application list in an adjacent external device and deliver it to the control unit 170 or the storage unit 140. The external device interface unit 135 may provide a connection path with an external device. The external interface unit 135 may receive at least one of image and audio output from an external device that is wirelessly or wiredly connected to the display device 100 and deliver it to the control unit. An external device connectable to the external device interface unit 135 may be one of a set-top box, a Blu-ray player, a DVD player, a game console, a sound bar, a smartphone, a PC, a USB Memory, and a home theater system.

The network interface unit 133 may provide an interface for connecting the display device 100 to a wired/wireless network including internet network. The network interface unit 133 may transmit or receive data to or from another user or another electronic device through an accessed network or another network linked to the accessed network.

Some content data stored in the display device 100 may be transmitted to a user or an electronic device, which may be selected from other users or other electronic devices pre-registered in the display device 100. The network interface unit 133 may access a predetermined webpage through an accessed network or another network linked to the accessed network. The network interface unit 133 may transmit or receive data to or from a corresponding server by accessing a predetermined webpage through network.

The network interface unit 133 may then receive content or data provided from a content provider or a network operator. The network Interface unit 133 may receive content such as movies, advertisements, games, VODs, and broadcast signals, which may be provided from a content provider or a network provider, through network and information relating thereto.

The network interface unit 133 may additionally receive firmware update information and update files provided from a network operator and transmit data to an internet or content provider or a network operator. The network interface unit 133 may select and receive a desired application among applications open to the air, through a network.

The storage unit 140 may store signal-processed image, voice, or data signals stored by a program in order for each signal processing and control in the control unit 170. The storage unit 140 may temporarily store image, voice, or data signals output from the external device interface unit 135 or the network interface unit 133 and may store information on a predetermined image through a channel memory function. The storage unit 140 may store an application or an application list input from the external device interface unit 135 or the network interface unit 133.

The display device 100 may play content files (for example, video files, still Image files, music files, document files, application files, and so on) stored in the storage unit 140 and provide them to a user. The user input interface unit 150 may deliver signals input from a user to the control unit 170 or deliver signals from the control unit 170 to a user. For example, the user Input interface unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

The user input interface unit 150 may deliver, to the control unit 170, control signals input from local keys such as a power key, a channel key, a volume key, and a setting key. Image signals that are image-processed in the control unit 170 may be input to the display unit 180 and displayed as an image corresponding to corresponding image signals. Additionally, image signals that are image-processed in the control unit 170 may be input to an external output device through the external device interface unit 135.

Voice signals processed in the control unit 170 may be output to the audio output unit 185. Additionally, voice signals processed in the control unit 170 may be input to an external output device through the external device interface unit 135.

The control module 170 may control overall operations in the display device 100. The control unit 170 may also control the display device 100 by a user command or internal program input through the user input interface unit 150 and download a desired application or application list into the display device 100 by access to a network.

The control unit 170 may output channel information selected by a user together with processed image or voice signals through the display unit 180 or the audio output unit 185. According to an external device image playback command received through the user input interface unit 150, the control unit 170 may output image signals or voice signals of an external device such as a camera or a camcorder, which may be input through the external device interface unit 135, through the display unit 180 or the audio output unit 185.

The control unit 170 may control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 may be a still image or video and also may be a 2D image or a 3D image. The control unit 170 may play content stored in the display device 100, received broadcast content, and external input content input from the outside, and the content may be in various formats such as broadcast images, external input images, audio files, still images, accessed web screens, and document files.

The short-range communication unit 173 may perform a wired or wireless communication with an external electronic device. The short-range communication unit 173 may perform short-range communication with an external device. The short-range communication unit 173 may support short-range communication by using at least one of Bluetooth™, Radio Frequency Identification (RFID), infrared Data Association (IrDA), Ultra Wideband (UWB), ZigBee, Near Field Communication (NFC), Wireless-Fidelity (Wi-F), WI-Fi Direct, and Wireless Universal Serial Bus (USB) technologies. The short-range communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

The other display device 100 may be a mobile terminal such as a wearable device (for example, a smart watch, a smart glass, and a head mounted display (HMD)) or a smartphone, which is capable of exchanging data (or interworking) with the display device 100. The short-range communication unit 173 may detect (or recognize) a communicable wearable device around the display device 100. If the detected wearable device is a device authenticated to communicate with the display device 100, the control unit 170 may transmit at least part of the data processed in the display device 100 to the wearable device through the short-range communication unit 173. Accordingly, a user of the wearable device may use the data processed in the display device 100 through the wearable device.

The display unit 180 may convert image signals, data signals, or OSD signals, which are processed in the control unit 170, or images signals or data signals, which are received in the external device interface unit 135, into R, G, and B signals to generate driving signals. The display device 100 shown in FIG. 1 is just one embodiment of the present invention and thus, some of the components shown may be integrated, added, or omitted according to the specification of the actually implemented display device 100.

According to another embodiment, the display device 100 may receive images through the network interface unit 133 or the external device interface unit 135 and play them without including the tuner 131 and the demodulation unit 132. For example, the display device 100 may be divided into an image processing device such as a set-top box that receives broadcast signals or content according to various network services and a content playback device that plays content inputted from the image processing device.

Figure 2:
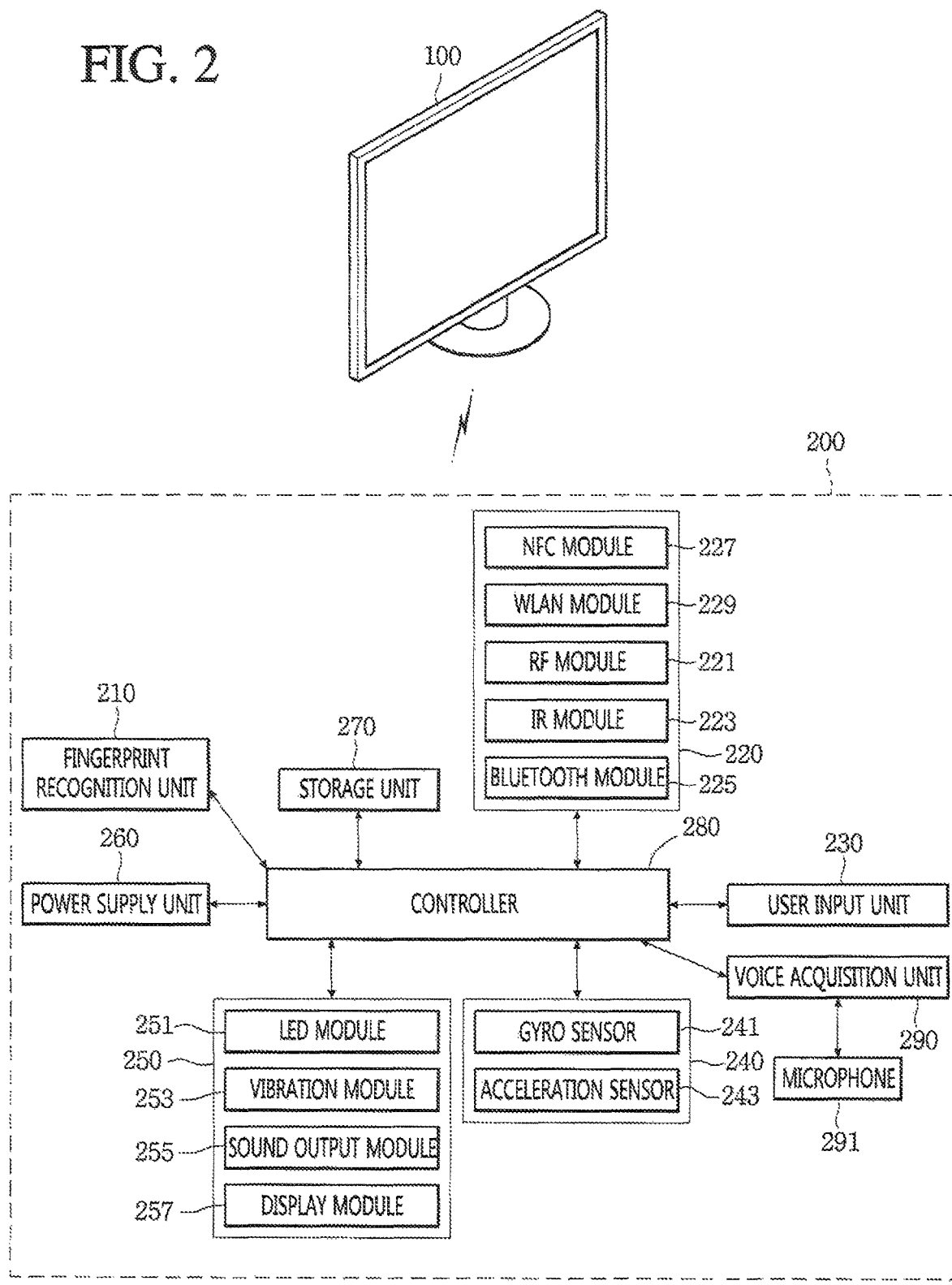
FIG. 2 is a block diagram illustrating a remote control device.

Referring to FIG. 2, a remote control device (or remote control) 200 may include a fingerprint recognition unit or device 210, a wireless communication unit or device 220, a user input unit (or user input) 230, a sensor unit (or sensor) 240, an output unit (or output) 250, a power supply unit (or power supply) 260, a storage unit (or memory) 270, a control unit (or controller) 280, and a voice acquisition unit (or device) 290. The wireless communication unit 225 may transmit/receive signals to/from an arbitrary display device according to the above-mentioned embodiments. The remote control device 200 may include an RF module 221 that transmits or receives signals to or from the display device 100 according to the RF communication standards and an IR module 223 that transmits or receives signals to or from the display device 100 according to the IR communication standards.

The remote control device 200 may include a Bluetooth module 225 that transmits or receives signals to or from the display device 100 according to the Bluetooth communication standards. The remote control device 200 may also Include an NFC module 227 that transmits or receives signals to or from the display device 100 according to the Near Field Communication (NFC) communication standards and a WLAN module 229 that transmits or receives signals to or from the display device 100 according to the Wireless LAN (WLAN) communication standards The remote control device 200 may transmit signals containing information on a movement of the remote control device 200 to the display device 100 through the wireless communication unit 220. The remote control device 200 may receive signals transmitted from the display device 100 through the RF module 221 and if necessary, can transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button.

Figure 3:
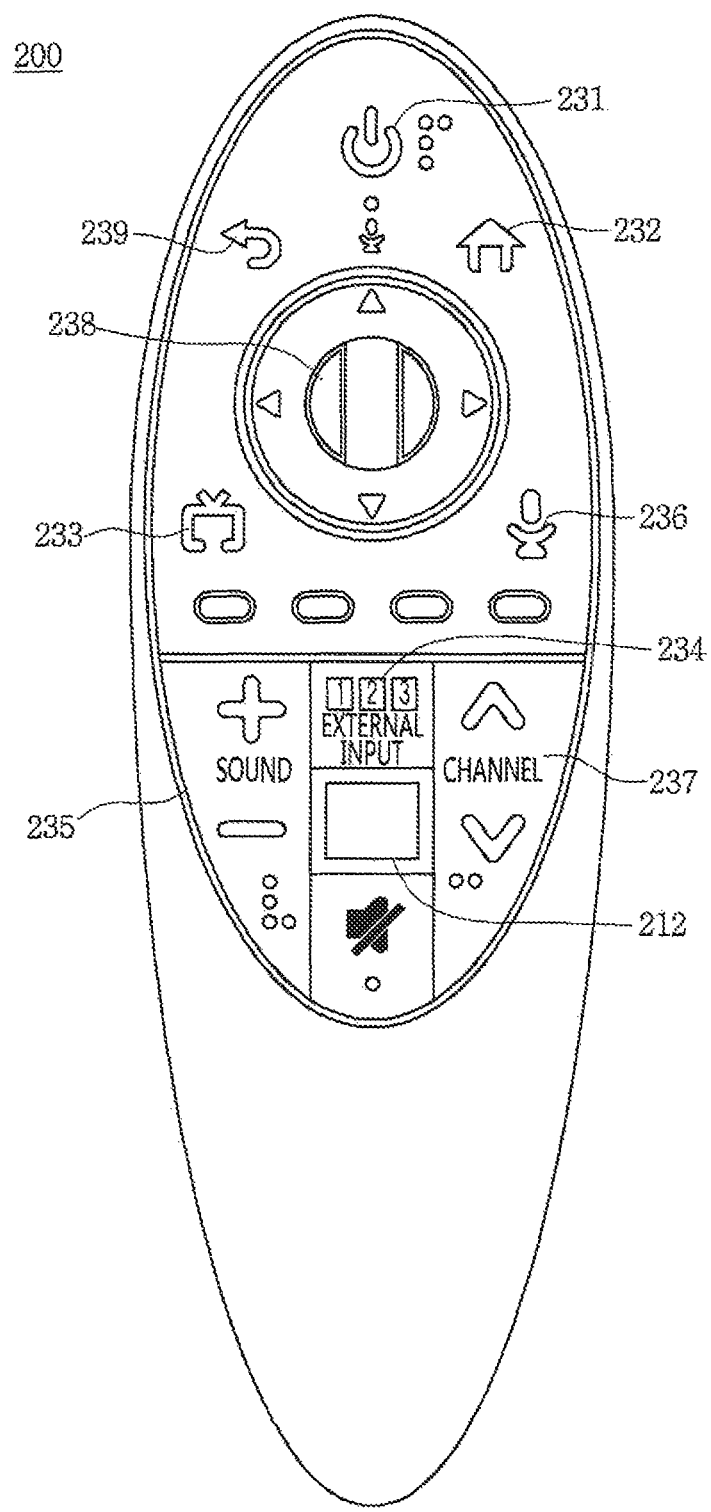
FIG. 3 illustrates an actual configuration of a remote control device.

Referring to FIG. 3, the remote control device 200 may include a plurality of buttons. The plurality of buttons may include a fingerprint recognition button 212, a power button 231, a home button 232, a live button 233, an external input button 234, a voice adjustment (or volume) button 235, a voice recognition button 236, a channel change button 237, a check (or select) button 238, and a back button 239.

The fingerprint recognition button 212 may recognize a user's fingerprint. The fingerprint recognition button 212 may perform a push operation and receive a push operation and a fingerprint recognition operation. The power button 231 may turn on/off the power of the display device 100. The power button 232 may move to the home screen of the display device 100. The live button 233 may display live broadcast programs. The external input button 234 may receive an external input connected to the display device 100.

The voice adjustment button 235 may adjust the size of a volume output from the display device 100. The voice recognition button 236 may receive user's voice and recognizing the received voice. The channel change button 237 select broadcast signals of a specific broadcast channel. The check button 238 select a specific function and the back button 239 may return to a previous screen.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the disclosure.

The sensor unit 240 may include a gyro sensor 241 or an acceleration sensor 243 and the gyro sensor 241 may sense information on a movement of the remote control device 200. The gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor to sense a distance with respect to the display unit 180 of the display device 100.

The output unit 250 may output image or voice signals corresponding to a manipulation of the user input unit 230 or corresponding to signals transmitted from the display device 100. A user may recognize whether the user input unit 230 is manipulated or the display device 100 is controlled through the output unit 250. The output unit 250 may include an LED module 251 that flashes, a vibration module 253 that generates vibration, a sound output module 255 that outputs sound, or a display module 257 that outputs an image, if the user input unit 230 is manipulated or signals are transmitted/received to/from the display device 100 through the wireless communication unit 220.

The power supply unit 260 may supply power to the remote control device 200 and if the remote control device 200 does not move for a predetermined time, stop the power supply, so that power waste may be reduced. The power supply unit 260 may resume power supply if a predetermined key provided at the remote control device 200 is manipulated.

The storage unit 270 may store various kinds of programs and application data necessary for a control or operation of the remote control device 200. If the remote control device 200 transmits/receives signals wirelessly through the display device 100 and the RF module 221, the remote control device 200 and the display device 100 that transmit and receive signals through a predetermined frequency band. The control unit 280 of the remote control device 200 may store, in the storage unit 270, information on a frequency band for transmitting/receiving signals to/from the display device 100 paired with the remote control device 200 and refer to it.

The control unit 280 may control general matters relating to a control of the remote control device 200. The control unit 280 may transmit a signal corresponding to a predetermined key manipulation of the user input unit 230 or a signal corresponding to a movement of the remote control device 200 sensed by the sensor unit 240 to the display device 100 through the wireless communication unit 220. Additionally, the voice acquisition unit 290 of the remote control device 200 may recognize as voice input. The voice acquisition unit 290 may include at least one microphone 291 and recognize the voice through the microphone 291.

Figure 4:
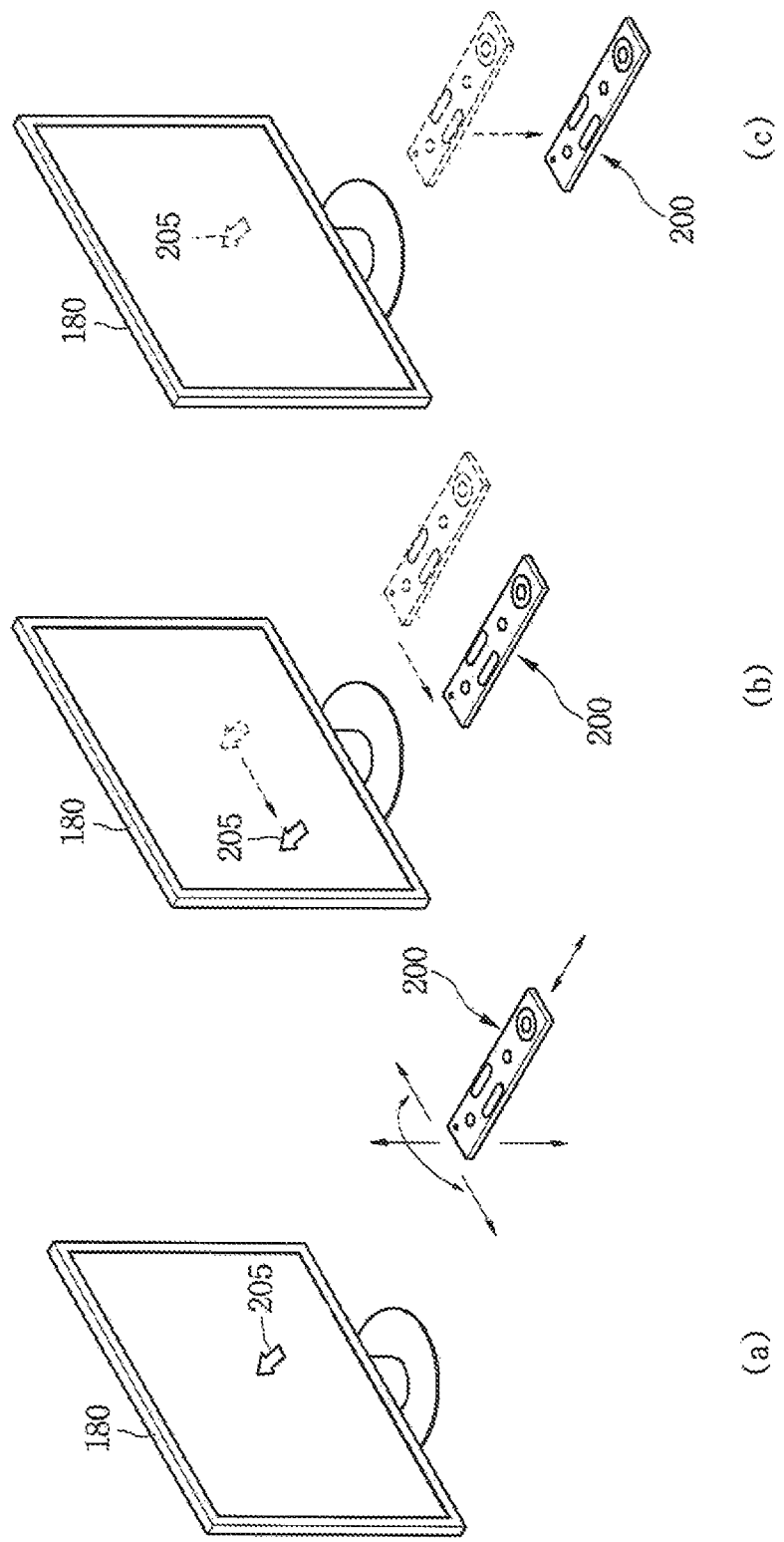
FIG. 4 is a view of utilizing a remote control device.

FIG. 4(a) illustrates that a pointer 205 corresponding to the remote control device 200 may be displayed on the display unit 180. A user may move or rotate the remote control device 200 vertically or horizontally. The pointer 205 displayed on the display unit 180 of the display device 100 may correspond to a movement of the remote control device 200. Since the corresponding pointer 205 is moved and displayed according to a movement on a 3D space as shown in the drawing, the remote control device 200 may be referred to as a spatial remote controller.

FIG. 4(b) illustrates that if a user moves the remote control device 200, the pointer 205 displayed on the display unit 180 of the display device 100 may be moved to the left in correspondence thereto. Information on a movement of the remote control device 200 detected through a sensor of the remote control device 200 may be transmitted to the display device 100. The display device 100 may calculate the coordinates of the pointer 205 from the information on the movement of the remote control device 200. The display device 100 may display the pointer 205 to match the calculated coordinates.

FIG. 4(c) Illustrates that while a specific button in the remote control device 200 is pressed, a user may move the remote control device 200 away from the display unit 180. Thus, a selection area in the display unit 180 corresponding to the pointer 205 may be zoomed in and displayed largely. If a user moves the remote control device 200 close to the display unit 180, a selection area in the display unit 180 corresponding to the pointer 205 may be zoomed out and displayed as a smaller image.

If the remote control device 200 is away from the display unit 180, a selection area may be zoomed out and if the remote control device 200 is close to the display unit 180, a selection area may be zoomed in. Additionally, if a specific button on the remote control device 200 is pressed, the recognition of a vertical or horizontal movement may be excluded. If the remote control device 200 is moved away from or close to the display unit 180, the up, down, left, or right movement may not be recognized and only the back and fourth movement may be recognized. While a specific button in the remote control device 200 is not pressed, only the pointer 205 may be moved according to the up, down, left or right movement of the remote control device 200.

The moving speed or moving direction of the pointer 205 may correspond to the moving speed or moving direction of the remote control device 200. A pointer in this specification may mean an object displayed on the display unit 180 in correspondence to an operation of the remote control device 200. Accordingly, besides an arrow form displayed as the pointer 205 in the drawing, various forms of objects are possible, such as, a point, a cursor, a prompt, and a thick outline. The pointer 205 may then be displayed in correspondence to one point of a horizontal axis and a vertical axis on the display unit 180 and also may be displayed in correspondence to a plurality of points such as a line and a surface.

Figure 5:
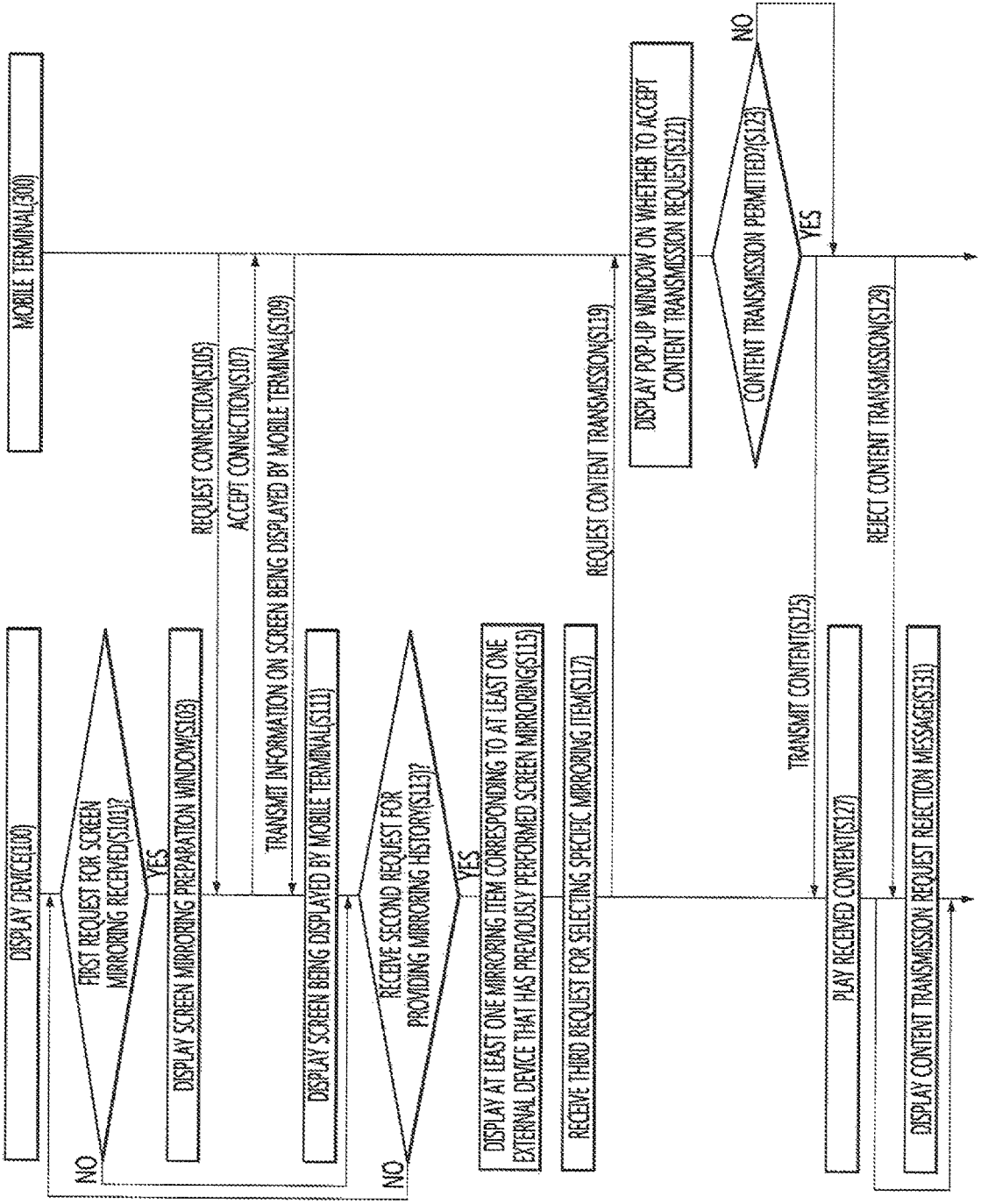
FIG. 5 is a ladder diagram Illustrating an operating method of a system according to an embodiment of the present invention.

FIG. 5 is a ladder diagram illustrating an operating method of a system according to an embodiment. Hereinafter, screen mirroring may be a function for displaying a screen as it is between terminals, and may be a function for transmitting a screen being displayed on a first terminal to a second terminal and allowing the first terminal and the second terminal to display the same screen. A user may watch the same content on more than two terminals through screen mirroring.

Referring to FIG. 5, the control unit 170 of the display device 100 may receive a first request for screen mirroring through the user input interface unit 150 in operation S101. According to an embodiment, the control unit 170 may receive a first request for screen mirroring from the remote control device 200. Alternatively, if the display unit 180 of the display device 100 is implemented with a touch screen, the control unit 170 may receive a first request through a touch input.

The control unit 170 of the display device 100 may display a screen mirroring preparation window through the display unit in operation S103 in response to the received first request. The screen mirroring preparation window may guide a user to set mirroring between the display device 100 and the mobile terminal 300 that is to perform screen mirroring.

The control unit 170 of the display device 100 may receive a connection request from the mobile terminal 300 in operation S105, and transmit the connection acceptance in response to the connection request in operation S107. The control unit 170 may receive a connection request from the mobile terminal 300 or transmit the connection acceptance through the short-range communication unit 173.

The mobile terminal 300 may receive a device selection input to select the display device 100 to perform screen mirroring with the mobile terminal 300, and transmit a connection request to execute a screen mirroring function to the display device 100 selected according to the received input. The control unit 170 of the display device 100 may transmit a connection acceptance to represent that the acceptance of a screen mirroring function execution to the mobile terminal 300 in response to the connection request has been received from the mobile terminal 300.

Operations S105 and S107 may be omitted. The mobile terminal 300 may directly transmit, to the display device 100, information being displayed in a display area of the mobile terminal, which may be a device selected according to a device selection input.

The mobile terminal 300 may transmit information on a screen displayed in the display area of the mobile terminal 300 to the display device 100 through the short-range communication unit 173 in operation S109 in response to the connection acceptance received from the display device 100. Information on the screen may include information necessary to display the screen that the display unit of the mobile terminal 300 displays, on the display unit 180 of the display device 100 as it is. For example, if the mobile terminal 300 is displaying content, the mobile terminal 300 may transmit data on the content being displayed to the display device 100. Accordingly, the display device 100 may display the content displayed on the mobile terminal 300 as it is. The content being played on the mobile terminal 300 may be played on the display device 100 as it is.

The control unit 170 of the display device 100 may display a screen being displayed in the display area of the mobile terminal 300 through the display unit 180 in operation S111 on the basis of information on the screen received from the mobile terminal 300. Operation S101 to S111 will be described with reference to the drawings.

Figure 6:
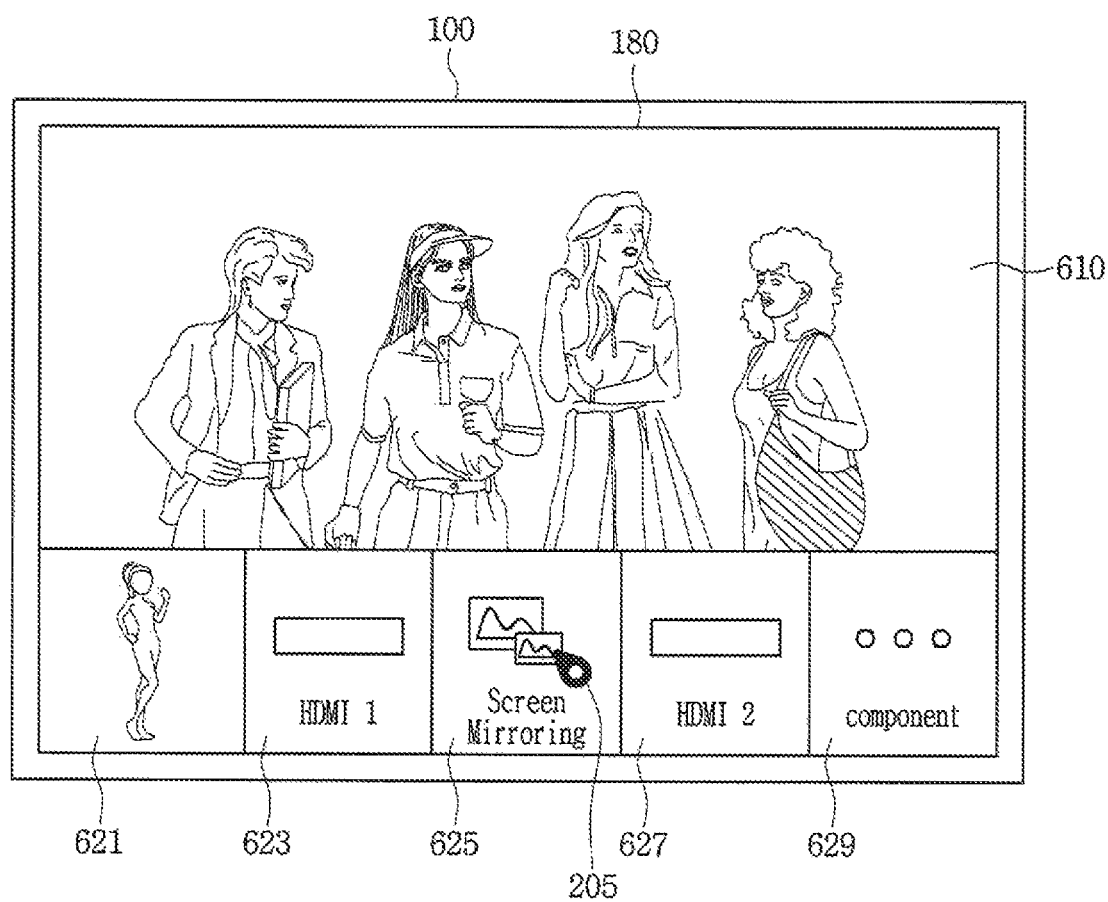

Referring to FIG. 6, the display unit 180 of the display device 100 is displaying a content image 610. The content image 610 may be a broadcast image received through the tuner 131 of FIG. 1 but is not limited thereto, and may be an image received from an external device through the external device interface unit 135 and an image received through the network interface unit 133.

The control unit 170 may display an external input list according to a request for displaying the external input list. The request for displaying the external input list may be received from the remote control device 200 during the playback of the content image 610.

The external input list may include a plurality of external input items 621 to 629. The first external input item 621 may include a thumbnail image of the most recently played content through an external input or a thumbnail of the most recently viewed broadcast program. The second external input item 623 may represent an external device connected through the High Definition Multimedia Interface (HDMI) standards. The third external input item 625 may provide a screen mirroring function with another terminal. The fifth external input item 629 may provide an image, received from an external device, with a high quality.

Figure 7:
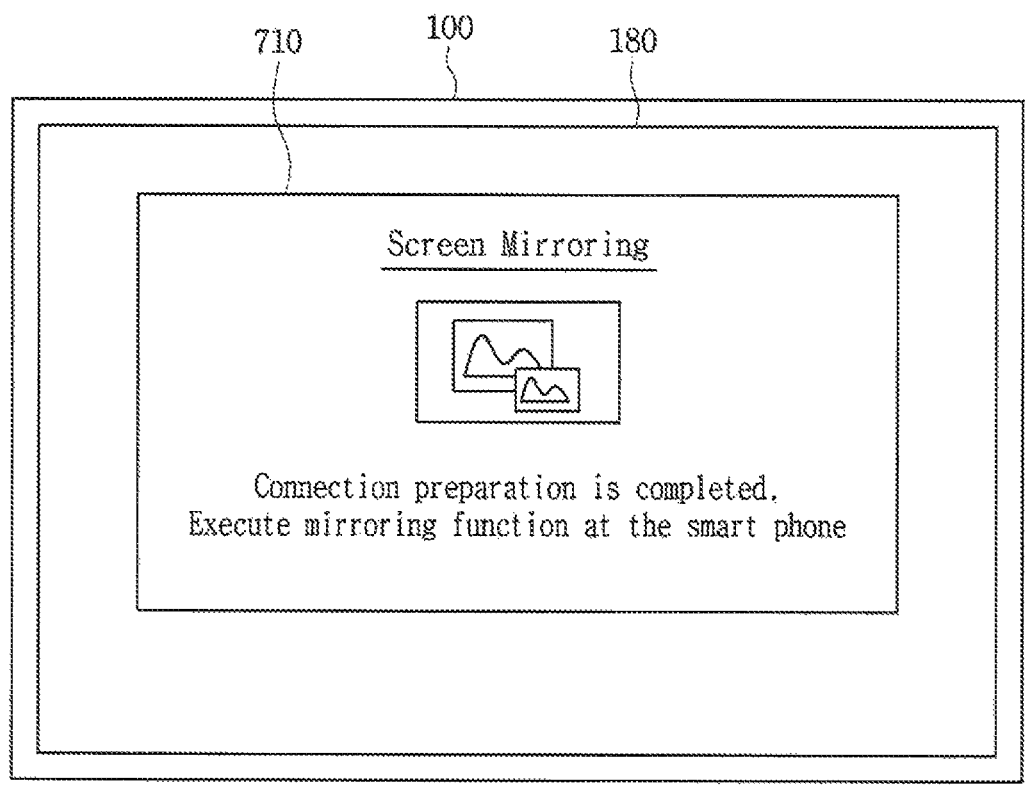

As shown in FIG. 7, the control unit 170 may display a screen mirroring preparation window 710 through the display unit 180 according to a request to select the third external input item 625. The control unit 170 may receive a request to select the third external input item 625 through a pointer 205 moving according to a movement of the remote control device 200. The screen mirroring preparation window 710 may include a text notification that the display device 100 is prepared to perform screen mirroring. The screen mirroring preparation window 710 may further include a guide text notification for operating the mobile terminal 300 in order to perform a screen mirroring function.

If a user performs a screen mirroring function with the display device 100 through an operation of the mobile terminal 300, as shown in FIG. 8, the mobile terminal 300 may transmit an image 810 of content being displayed on a display area to the display device 100 in real time. The display device 100 may receive the image 810 of the content received from the mobile terminal 300, and display the received image 810 of the content through the display unit 180. FIG. 8 shows a result obtained if a screen mirroring function is performed between the display device 100 and the mobile terminal 300. According to the performance of the screen mirroring function, the display device 100 and the mobile terminal 300 may display the same screen.

Referring to FIG. 5, the control unit 170 of the display device 100 may receive a second request to provide a mirroring history in operation 8113, and display at least one mirroring item corresponding to at least one external device that performs screen mirroring with the existing display device 100 in operation S115 according to the received second request. The second request for providing a mirroring history may be a request to provide information about an external device that performs screen mirroring with the existing display device 100 and information on content mirrored through the external device.

The second request to provide a mirroring history may be a request to select the third external input item 625, described with reference to FIG. 6, for a preset time. The preset time may be 2 sec.

The second request for providing a mirroring history may alternatively be a request to select the third external input item 625, described with reference to FIG. 6, a predetermined number of times for a preset time. The preset time may be 2 sec and a predetermined number of times may be two times.

Figure 9A:
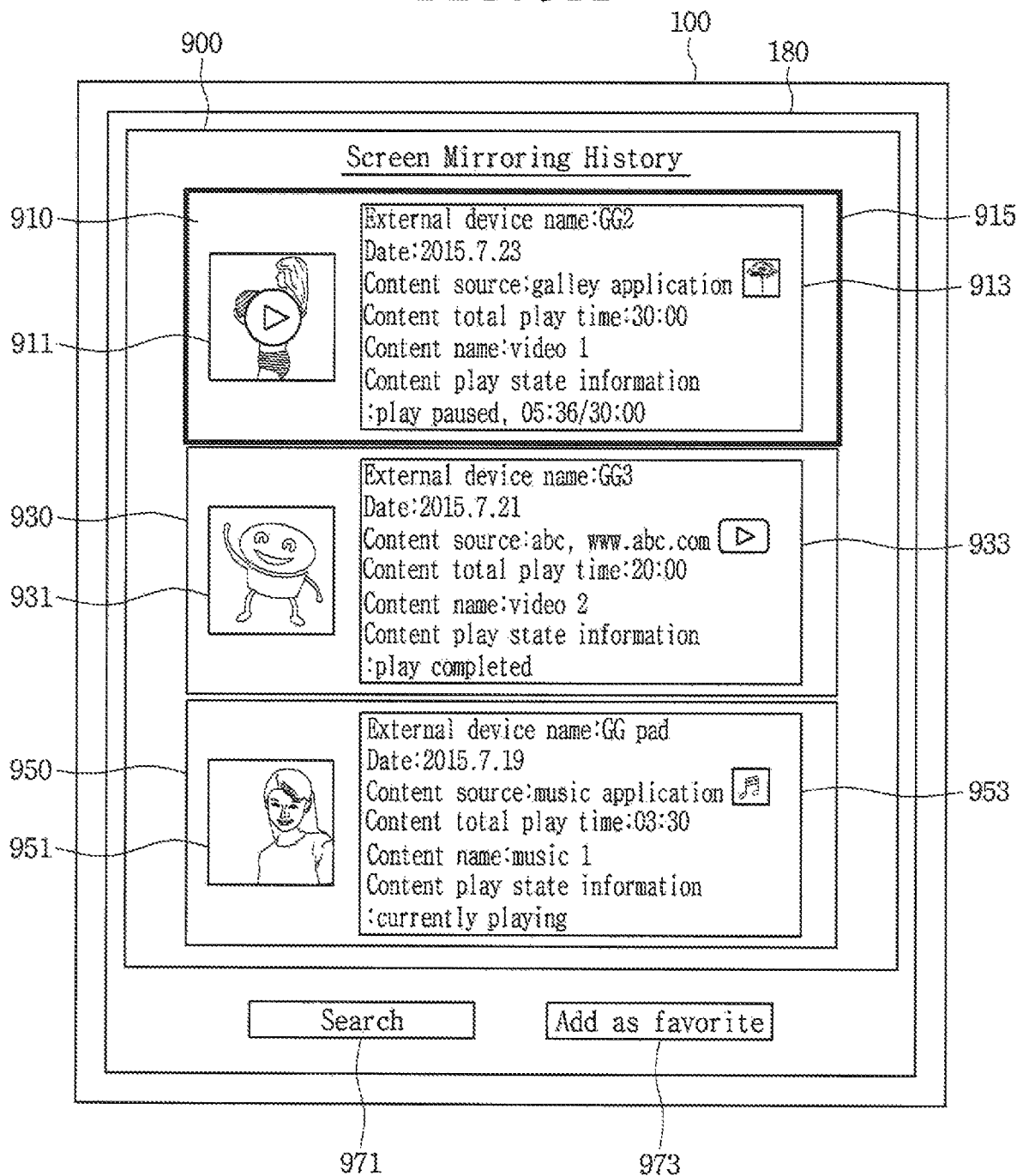

If a request to select the third external input item 627 in FIG. 6 for a preset time in order to provide screen mirroring service is received, the control unit 170, as shown in FIG. 9A, may display a mirroring history window 900 through the display unit 180. The mirroring history window 900 may provide information about an external device that has previously performed a screen mirroring function within the display device 100 and information on content mirrored through the external device. The mirroring history window 900 may include a plurality of mirroring items 910, 930, and 950.

The storage unit 140 may store a history of performing a screen mirroring function with the display device 100. The storage unit 140 may include a plurality of mirroring items 910, 930, and 950. Each mirroring item may include information for identifying an external device and information on content that the external device transmits to the display device 100. The external device may be the mobile terminal 300 described with reference to FIG. 5.

The information for identifying an external device may include at least one of the name of the external device that has performed screen mirroring previously, an image that represents the external device, and a model of the external device. Information on content may include at least one of a content thumbnail image, a content name, content playback state information that represents a content playback state, a content total playback section, information on a content provider that provides content, a content storage path, and a content access path.

Figure 9B:
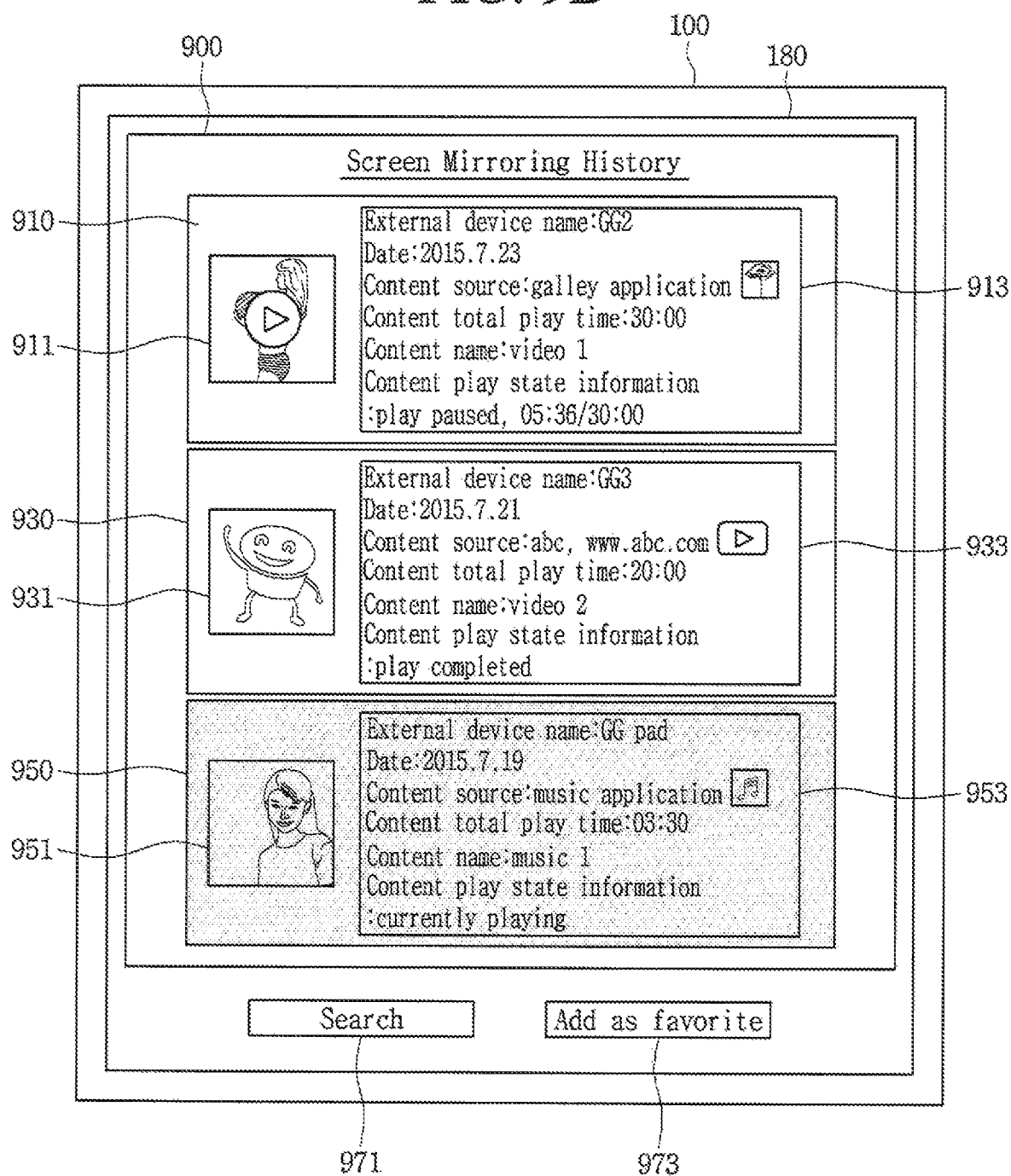

The mirroring history window 900 may further include a search button 971 and a favorite add button 973. The search button 971 may search for at least one of an external device corresponding to each mirroring item and an external device connectable to the current display device 100. If a request to select the search button 971 is received, the control unit 170 may search for an external device corresponding to each mirroring item included in the mirroring history window 900. If there is an external device connectable to the current display device 100 on the basis of a search result, the control unit 170, as shown in FIG. 9B, may display the third mirroring item 950 corresponding to the currently connectable external device separately from the first mirroring item 910 and the second mirroring item 930.

The favorite add button 973 may register at least one of the plurality of mirroring items 910, 930, and 950 as a favorite. If a specific mirroring item is selected from the plurality of mirroring items 910, 930, and 950 and the favorite add button 973 is selected, the control unit 170 may add the selected mirroring item to a favorite list.

Referring to FIG. 9A, the first mirroring item 910 may Include a content thumbnail image 911 for identifying content that an external device (for example, GG2) transmits to the display device 100 and content information 913. The content thumbnail image 911 may be a representative image for identifying content but is not limited thereto, and may alternatively be a content Image corresponding to a time point at which screen mirroring was stopped.

The content Information 913 may include at least one of the name (for example, GG2) of an external device that performs screen mirroring with the display device 100, a date (for example, 2015.7.23) that screen mirroring with the display device 100 was performed, information on a source that provides content (for example, gallery application and an image for identifying the gallery application), a content total playback section (for example, 30:00), a content name (for example, video 1), and content playback state information. The content playback state information may include at least one of information on whether content playback is completed through screen mirroring, whether content playback is stopped (or suspended), and whether content being played currently.

If content playback is stopped (or suspended), a text for representing that content playback may be stopped (i.e., play paused) and a content playback stop time point (for example, 05:36/30:00) among a content total playback time may be included in the content playback state information. The content playback stop time point may be a time point at which content playback is stopped according to a user input or a time point at which screen mirroring is stopped between the display device 100 and the mobile terminal 300.

The second mirroring item 930 may include a content thumbnail image 931 that identifies content that an external device (for example, GG3) transmits to the display device 100 and content information 933. The content thumbnail image 931 may be a representative image for identifying content but is not limited thereto, and may alternatively be a content image corresponding to a time point at which screen mirroring was stopped.

The content information 933 may include at least one of the name (for example, GG3) of an external device that performs screen mirroring with the display device 100, a date (for example, 2015.7.21) that screen mirroring with the display device 100 was performed, information on a source that provides content (for example, www.yotube.com and an image for identifying www.yotube.com), a content access path, a content total playback section (for example, 20:00), a content name (for example, video 2), and content playback state information. The content playback state Information may include at least one of information on whether content playback is completed through screen mirroring, whether content playback is stopped (or suspended), and whether content is being played currently.

If a content total section is played completely, a text for representing that content playback is completed (for example, play completed) may be included in content playback state Information. It may be represented that a content corresponding to the first mirroring item 910 mirrors a content stored in an external device and a content corresponding to the second mirroring item 930 mirrors a content that an external device accesses and obtains through a website.

The third mirroring item 950 may include a content thumbnail image 951 that identifies content that an external device (for example, GGpad) transmits to the display device 100 and content information 953. If a mirrored content is a music file, the content thumbnail image 951 may be an image including album information corresponding to the music file.

The content information 953 may include at least one of the name (for example, GGpad) of an external device that performs screen mirroring with the display device 100, a date (for example, 2015.7.19) that screen mirroring with the display device 100 was performed, information on a source that provides content (for example, music application and an image for identifying the music application), a content total playback time (for example, 20:00), a content name (for example, music 1), and content playback state information. The content playback state Information may include at least one of information on whether content playback is completed through screen mirroring, whether content playback is stopped (or suspended), and whether content is being played currently.

If content is being played on the display device 100 through the current screen mirroring, a text that the content is being played currently may be included in content playback state information. Alternatively, the plurality of mirroring items 910, 930, and 950 may be distinguished from each other according to whether they are connected to the current display device 100.

Referring to FIG. 9B, the external device GG2 corresponding to the first mirroring item 910 and the external device GG3 corresponding to the second mirroring item 930 may not be connected to the current display device 100 and only the external device GGpad corresponding to the third mirroring item 950 may be connected to the display device 100. The control unit 170 may display the first mirroring item 910 and the second mirroring item 930 to be distinguished from the third mirroring item 950. For example, the third mirroring item 950 may be highlighted and displayed.

Figure 9C:
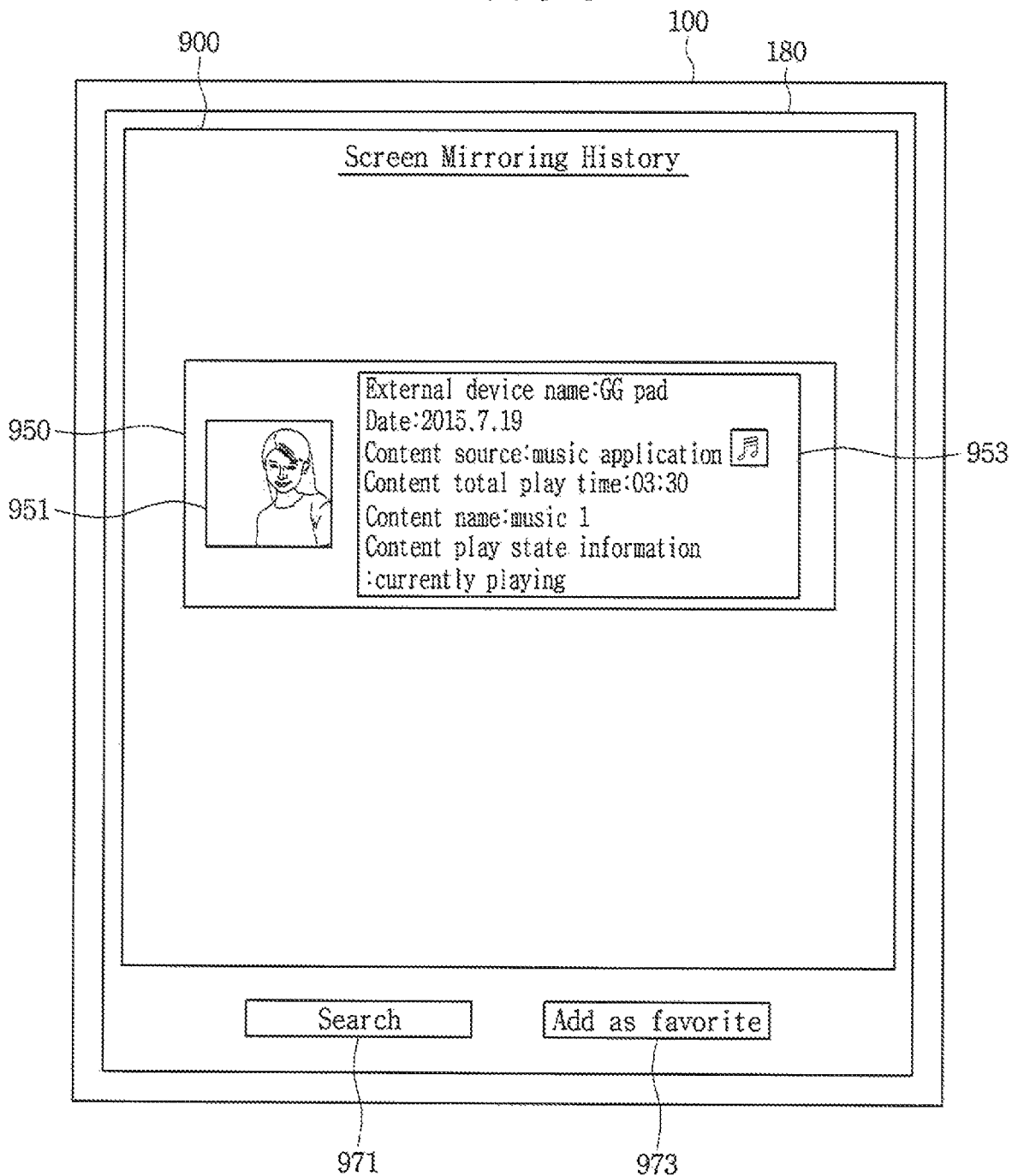

The mirroring history window 900 may include only a mirroring item corresponding to an external device that is currently connectable to the display device 100. Referring to FIG. 9C, only the external device GGpad corresponding to the third mirroring item 950 among the plurality of mirroring items may be connectable to the display device 100. An external device that is currently connectable to the display device 100 may be a device that has performed screen mirroring with the display device 100 previously within a short-range wireless communication available distance range. The control unit 170 may control the display unit 180 to display the third mirroring item 950 corresponding to the currently connectable external device GGpad on the mirroring history window 900.

Figure 9D:
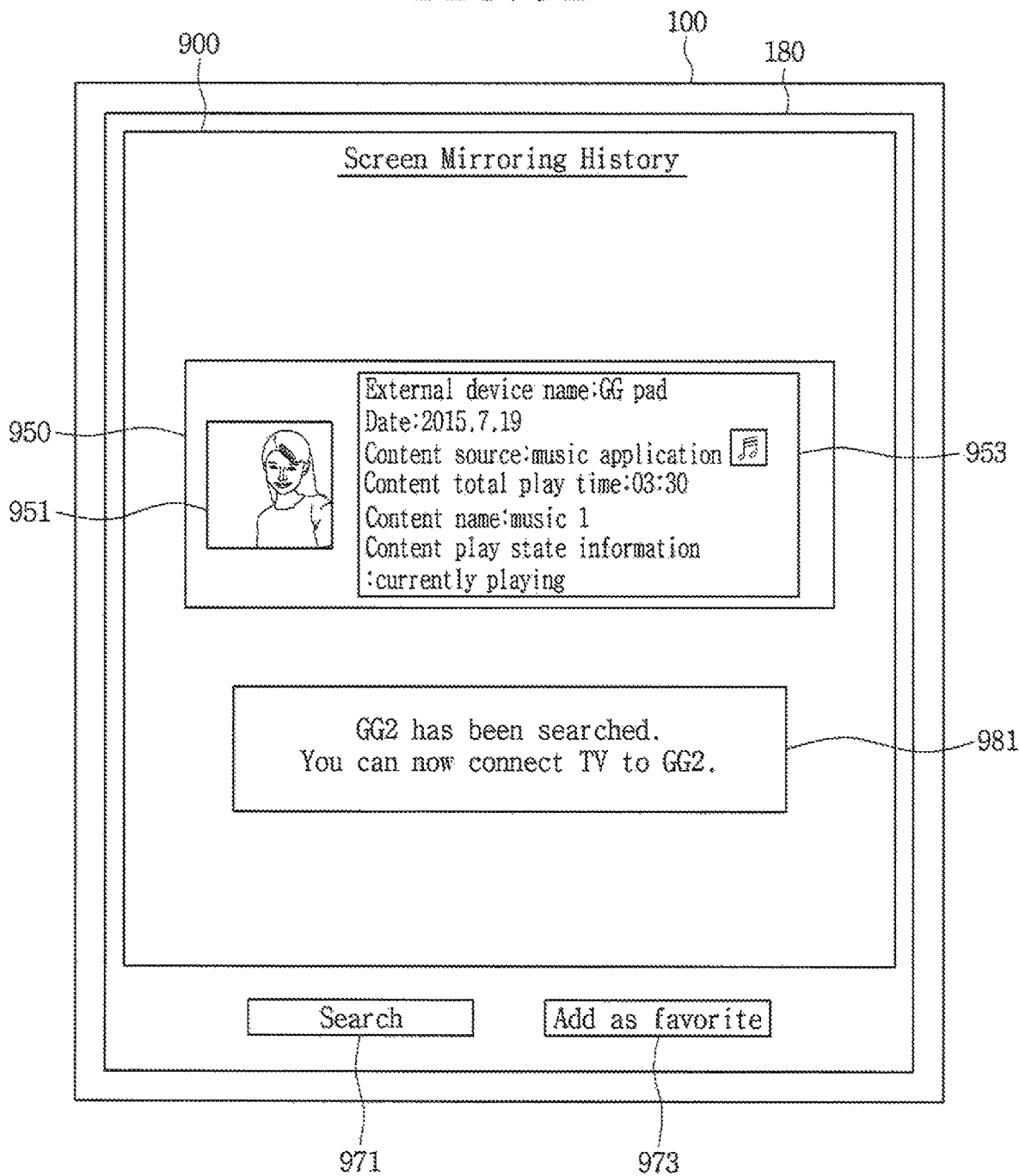

As shown in FIG. 9C, if another external device that has previously performed screen mirroring with the display device 100 becomes connectable, the control unit 170, as shown in FIG. 9D, may display a message window 981 that alerts that another external device GG2 is found and may be connectable. The control unit 170 may then include the first mirroring item 910 corresponding to the other accessible electronic device GG2 in the mirroring history window 900, as shown in FIG. 9A. The control unit 170 may automatically include the first mirroring item 910 in the mirroring history window 900 or include the first mirroring item 910 in the mirroring history window 900 according to an additional user input.

The control unit 170 of the display device 100 may receive a third request for selecting a specific mirroring item from at least one displayed mirroring item in operation S117, and transmit a content transmission request that requires the transmission of a content corresponding to the selected mirroring item to the mobile terminal 300 in operation S119 according to the third received request. The control unit 170 may request the transmission of content that was previously mirrored to an external device corresponding to the selected mirroring item according to the third request.

Alternatively, the control unit 170 may request information on a screen that the external device displays from the external device corresponding to the selected mirroring item as receiving the third request. The mobile terminal 300 may display a pop-up window to receive an input on whether to receive the content transmission request in response to the content transmission request received from the display device 100 in operation S121. If the content transmission request is permitted through the pop-up window in operation S123, the mobile terminal may transmit the content to the display device 100 in operation S125, and the control unit 170 of the display device 100 may play the content received from the mobile terminal 300 in operation S127.

Referring to FIG. 10A, the control unit 170 may select the first mirroring item 910 from the plurality of mirroring items 910, 930, and 950 included in the mirroring history providing window 900. The request to select the first mirroring item 910 may be received from the remote control device 200. The selected first mirroring item 910 may be distinguished from the other mirroring items 930 and 950 through a highlight box 915. A user may select a specific mirroring item by moving the highlight box 915 with the remote control device 200.

If the first mirroring item 910 is selected, the control unit 170 may request content transmission from an external device corresponding to the selected first mirroring item 910. For example, if the external device is the mobile terminal 300, the control unit 170 may request content transmission from the mobile terminal 300 through the short-range communication unit 173. The content may be content that the display device 100 has received through screen mirroring with the mobile terminal 300 previously but is not limited thereto, and may be content that the mobile terminal 300 is displaying currently.

The mobile terminal 300 may display a connection request pop-up window 1000 that represents that a connection request has been received according to a content transmission request received from the display device 100. The connection request pop-up window 1000 may include text for representing that a content transmission request is received from the display device 100, an accept button 1010 to accept content transmission, a reject button 1020 to reject content transmission, and a detail function 1030 to provide detailed information on a requested content.

Figure 10B:
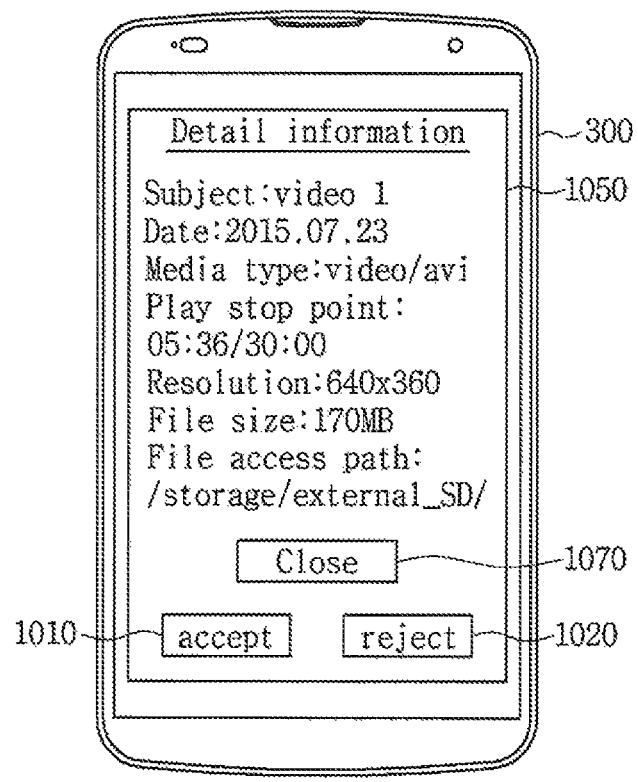

If the detail button 1030 is selected, the mobile terminal 300, as shown in FIG. 10B, may display a detail information providing window 1050 that provides detailed information on content. The detail information providing window 1050 may include detailed information on content requested from the display device 100. The content requested from the display device 100 may be content that has been transmitted to the display device 100 previously according to the performance of screen mirroring with the display device 100. The detail information providing window 1050 may include at least one of a content title, a date of performing screen mirroring, a content media type, a content playback stop time point, a resolution, a content size, and a content storage path (or a content access path). If a close button 1070 is selected, the mobile terminal 300 may display the connection request pop-up window 1000 shown in FIG. 10A again.

As a request for selecting the first mirroring item 910 is received, the control unit 170 may request transmission on a screen being displayed by the mobile terminal 300 corresponding to the selected first mirroring item 910. Accordingly, the display device 100 may display a screen identical to the screen being displayed by the mobile terminal 300. If the mobile terminal 300 corresponding to the selected first mirroring item 910 is distant from the display device 100, screen mirroring may be performed through a server.

Figure 11:
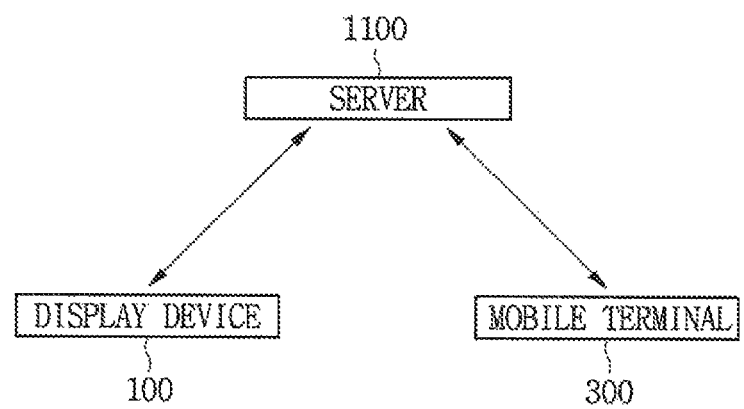

Referring to FIG. 11, if the mobile terminal 300 is distant from the display device 100, the display device 100 may request content transmission from the server 1100 through the network interface unit 133. The network interface unit 133 may request content transmission from the server 1100 via internet.

The server 1100 may deliver the content transmission request received from the display device 100 to the mobile terminal 300. The mobile terminal 300 may transmit the requested content to the server 1100 in response to the content transmission request received from the server 1100. The server 1100 may transmit the content received from the mobile terminal 300 to the display device 100. The display device 100 may play the content received from the server 1100. If the mobile terminal 300 corresponding to the first mirroring item 910 is located a short distance from the display device 100, the display device 100 may perform screen mirroring through the short-range communication unit 173.

If the accept button 1010 is selected in FIG. 10A, the mobile terminal 300 may transmit the content requested from the display device 100 to the display device 100. Referring to FIG. 12, the display device 100 may play an image of the content received from the mobile terminal 300. The control unit 170 of the display device 100 may play content from the playback stop time point of the content shared through previous screen mirroring. The content playback stop time point may represent a time point at which screen mirroring is stopped (or terminated) between the display device 100 and the mobile terminal 300 during the content playback.

The mobile terminal 300 may display an image 1200 of the content being transmitted to the display device 100. The mobile terminal 300 may display the image 1200 of the content while displaying a website screen 1210. For example, the mobile terminal 300 may display the image 1200 of content being transmitted to the display device 100 in an area that the website screen 1210 occupies. A user of the mobile terminal 300 may then perform another task while viewing a process that transmits content to the display device 100. As another example, the mobile terminal 300 may not display the image 1200 of the content while transmitting the content to the display device 100.

If the content transmission request is not permitted through the pop-up window in operation S123, the mobile terminal may transmit a content transmission rejection message to the display device 100 in operation S129, and the control unit 170 of the display device 100 may display a message that the content transmission request is rejected on the basis of the received content transmission rejection message in operation S131.

Figure 13:
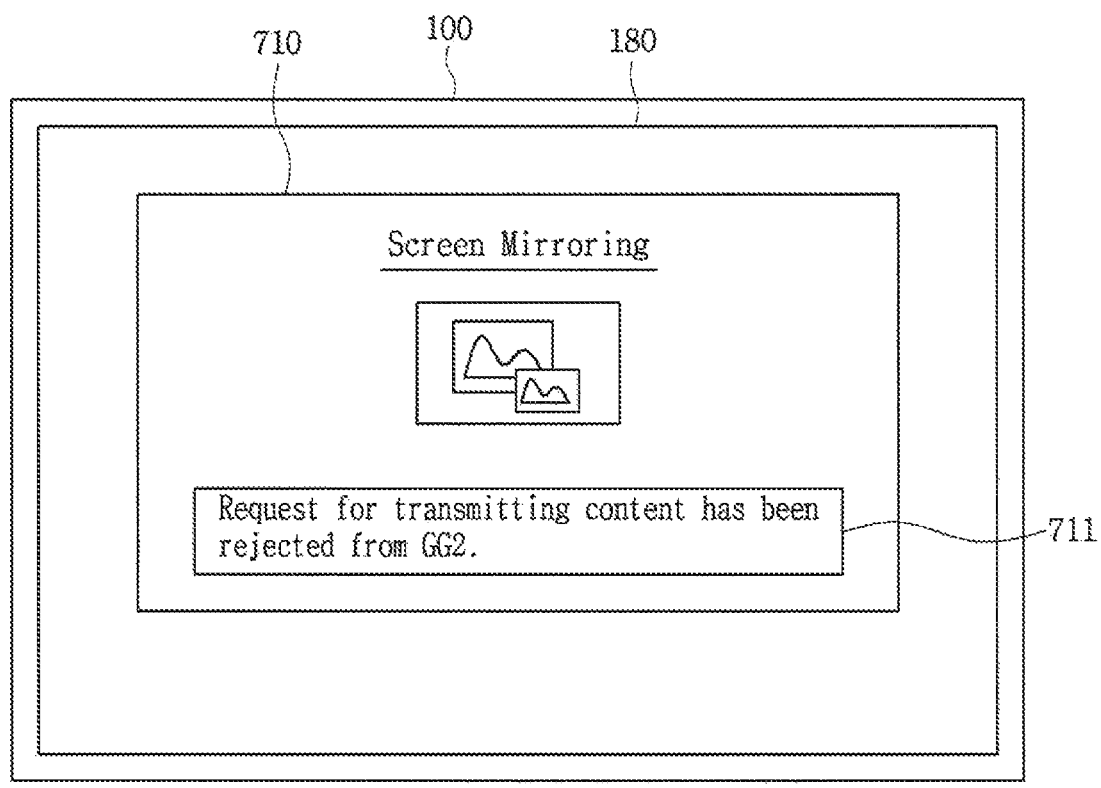
FIGS. 13 to 15 illustrate a message displayed by a display device if a content transmission request is not permitted according to various embodiments.

If the reject button 1020 is selected in FIG. 10A, the mobile terminal 300 may transmit a content transmission rejection message to the display device 100. As shown in FIG. 13, on the basis of the content transmission rejection message received from the mobile terminal 300, the display device 100 may display a message 711 that the content transmission requested is rejected. The display device 100 may display the message 711 on the screen mirroring preparation window 710.

Figure 14:
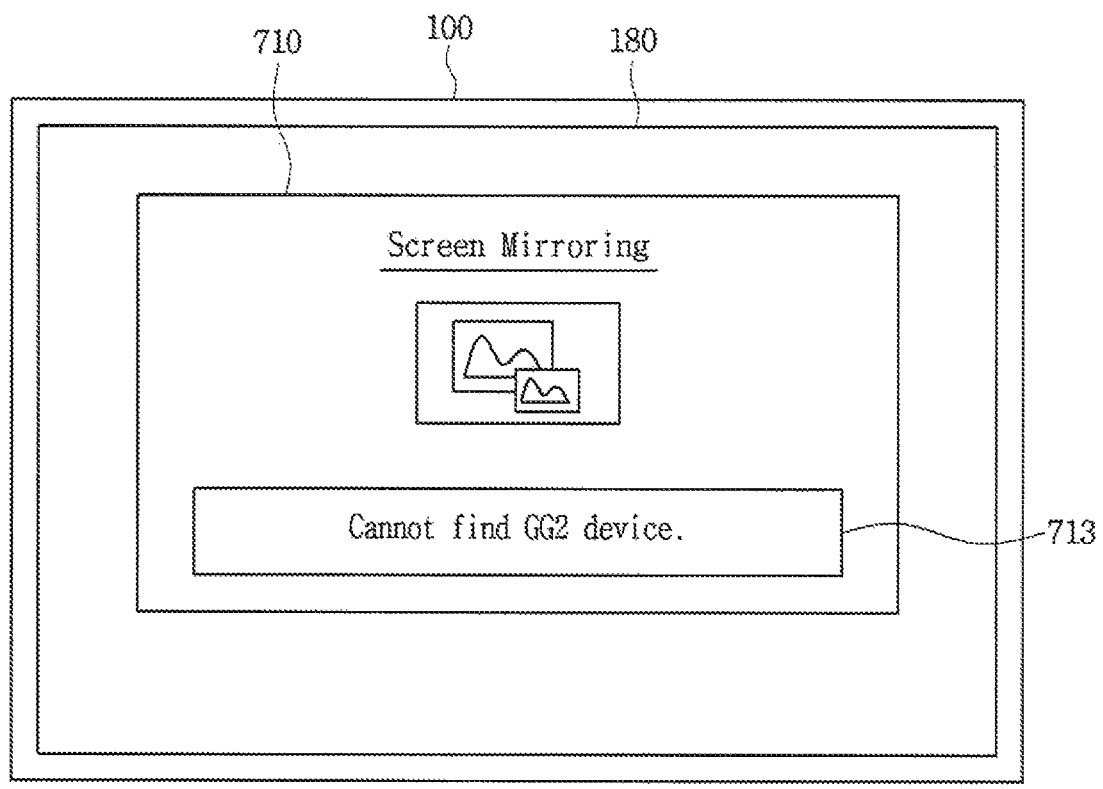

Moreover, if the mobile terminal 300 corresponding to the selected first mirroring item 910 in FIG. 10A is not found, the control unit 170, as shown in FIG. 14, may display a message 713 that the mobile terminal 300 is not found through the display unit 180. The display device 100 may display the message 713 on the screen mirroring preparation window 710. If the battery charging amount of the mobile terminal 300 is 0%, the display device 100 may display the message 713 that the mobile terminal 300 is not found.

The mobile terminal 300 corresponding to the selected first mirroring item 910 may not be found, but content requested by the display device 100 may be content provided from a content provider instead of content stored in the mobile terminal 300. In this case, the control unit 170 may be in a state that an access path of a corresponding content is stored in the storage unit 140. The access path may be an access address such as Uniform Resource Locator (URL).

Figure 15:
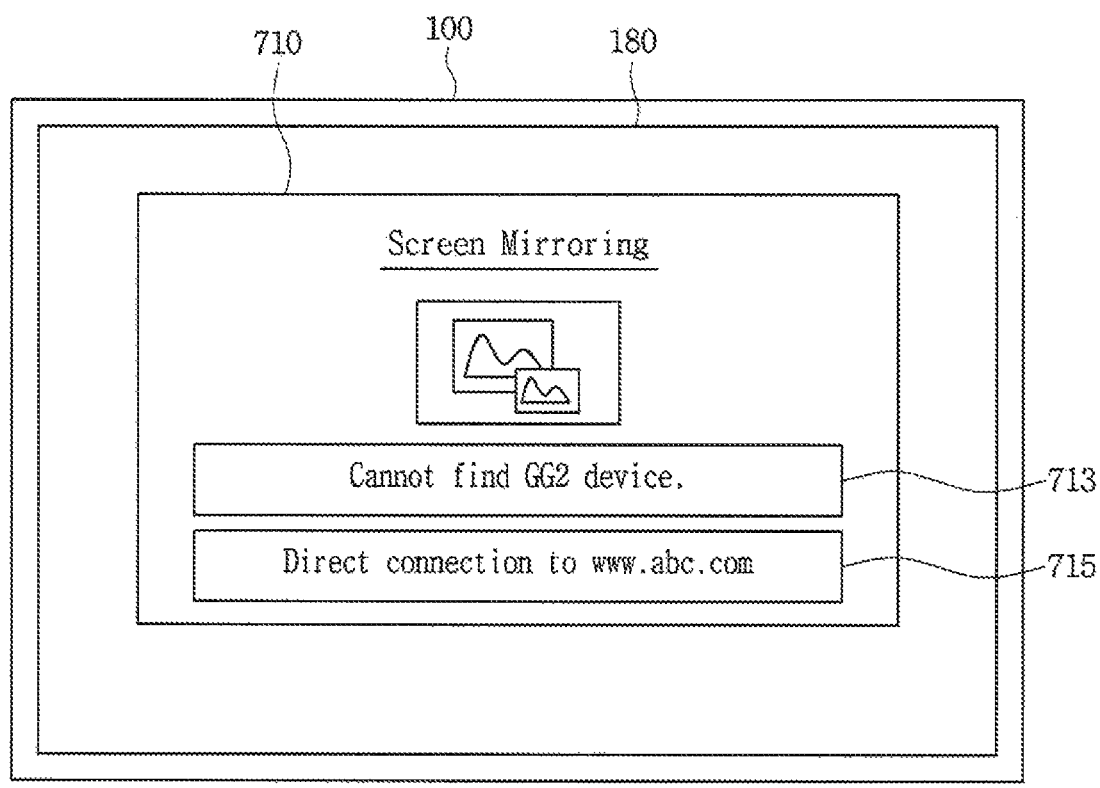

If the mobile terminal 300 is not found, the control unit 170, as shown in FIG. 15, may display a content access path 715 through which the content is obtainable in addition to the message 713 that the mobile terminal 300 is not found. The display device 100 may access a server of a corresponding content provider to obtain the content as a request for selecting the content access path 715 is received.

Figure 16:
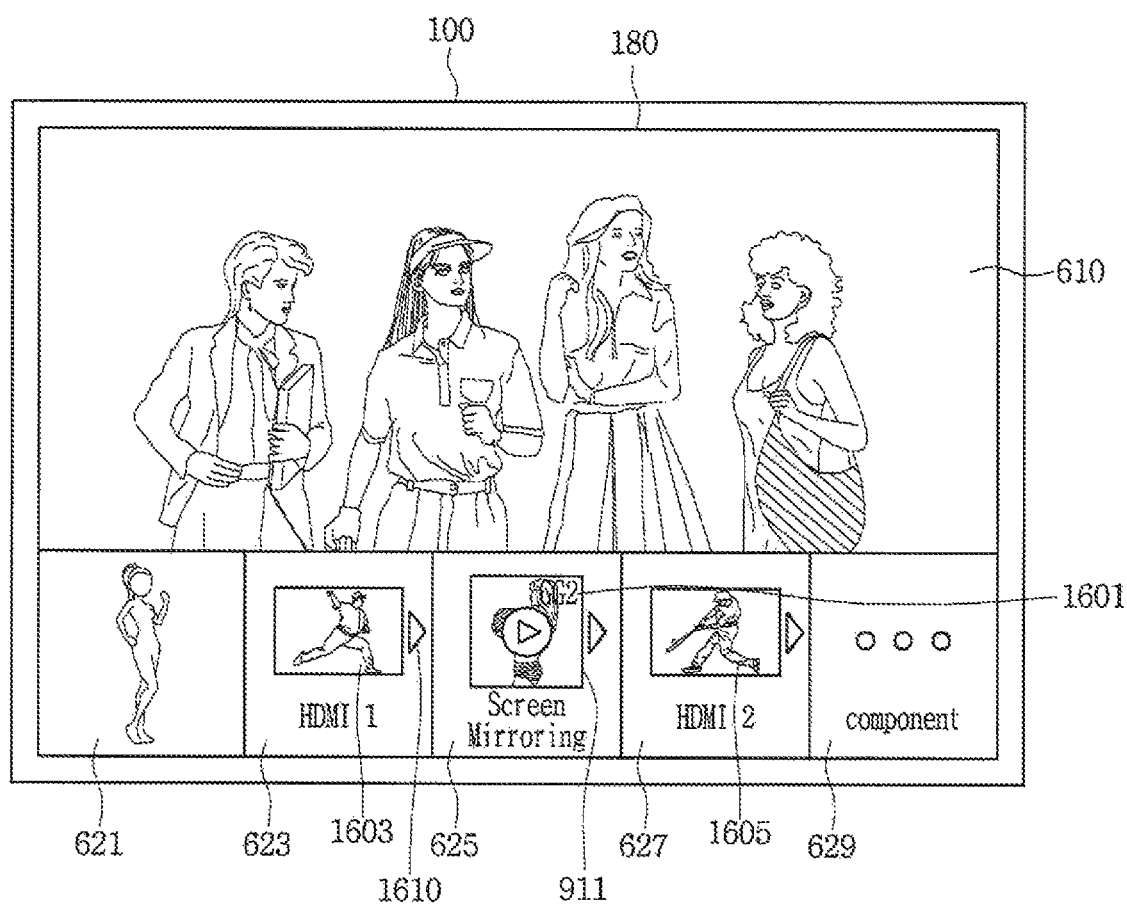
FIG. 16 illustrates information on an external device that performs screen mirroring with the display device 100 most recently and information on a content, on an external input list.

FIG. 16 displays information on an external device that has performed screen mirroring with the display device 100 most recently and information on content on an external input list. FIG. 16 is identical to FIG. 6 but information displayed on the third external input item 625 is different. Referring to FIG. 16, information on 1601 on an external device that has performed screen mirroring with the display device 100 most recently and a thumbnail image 911 of content may be included in the third input item 625. Information on content may be displayed in addition to the content thumbnail image 911.

Thumbnail images 1603 and 1605 may be displayed on the second external input item 623 and the fourth external input item 627, respectively, which represent external input terminals. A thumbnail image 1603 based on an image signal input from an external device corresponding to the second external input item 623 may be displayed on the second external input item 623.

The thumbnail image 1603 can be an image corresponding to an image output from an external device that was most recently connected to an HDMI 1 terminal. If an image input from an external device connected to the display device 100 is played for more than a predetermined time through the display unit 180, the thumbnail image 1603 may be displayed on the second external input item 623. If a plurality of images are input through the second external input item 623 and played sequentially, the display device 100 may further display a move button 1610 on the second external input item 623. The move button 1610 may display a thumbnail image different from the thumbnail image 1603 on the second external input item 623. For example, if the move button 1610 is selected, the thumbnail image 1603 may be switched to another thumbnail image and displayed.

The other thumbnail image may be an image corresponding to another image before an input of an image corresponding to the thumbnail image 1603. The other image may be an image input from the same external device or a different external device. The move button may be displayed on the third external input item 625 and the fourth external input item 627. If a move button displayed on the third external input item 625 is selected, a thumbnail image of an image transmitted from an external device that has performed screen mirroring with the display device 100 before the external device GG2 may be displayed.

A thumbnail image may be switched through a wheel equipped at the remote control device 200 instead of the move button 1610. The mirroring history window 900 described with reference to FIGS. 9A and 9B may be included in the screen mirroring preparation window 700 and displayed.

Figure 17:
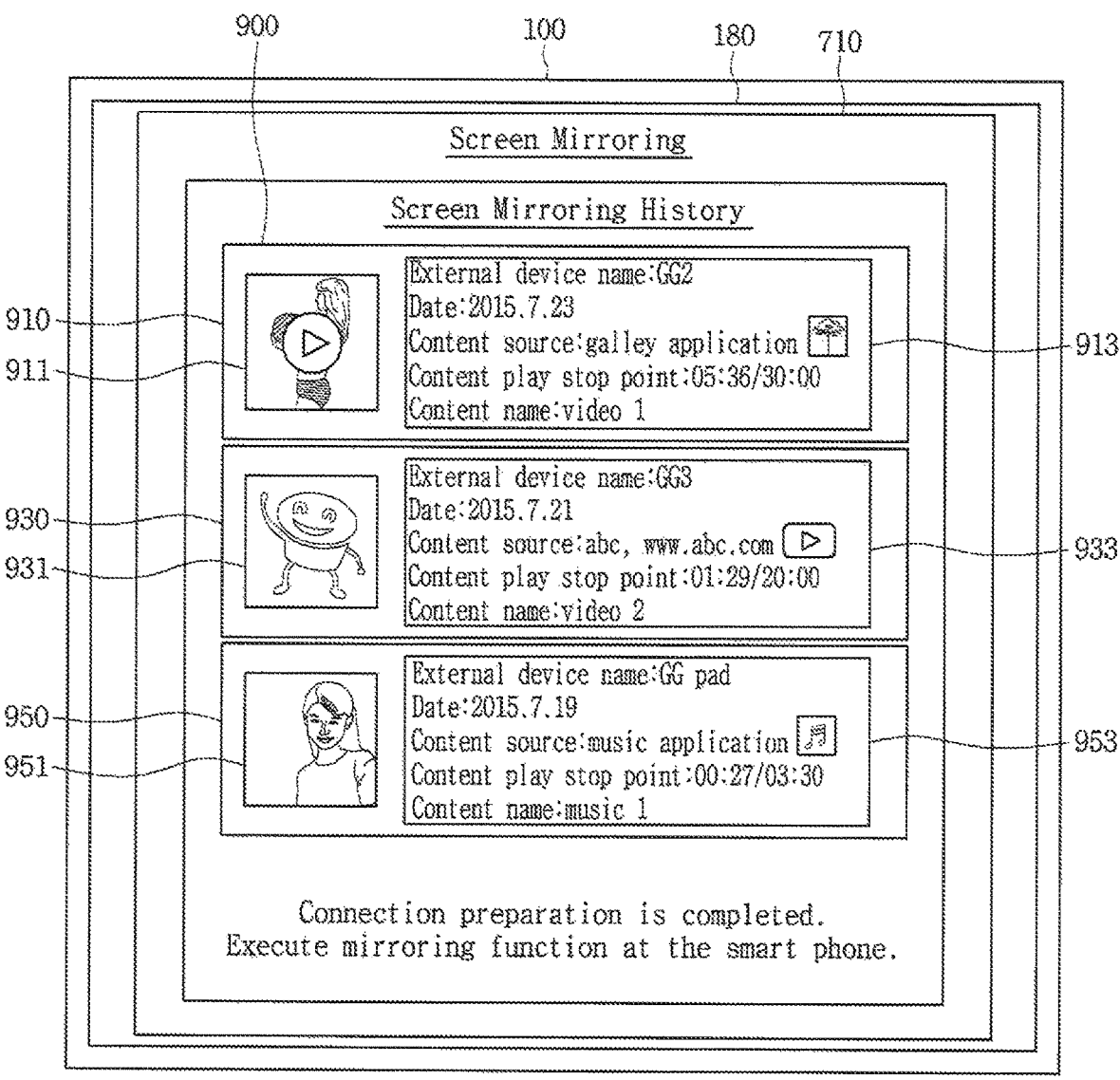
FIG. 17 illustrates a mirroring history window on a screen mirroring preparation window according to an embodiment of the present invention.

Referring to FIG. 17, the screen mirroring preparation window 710 may include the mirroring history window 900. Information included in the mirroring history window 900 may be the same as that described with reference to FIGS. 9A and 9B. A user may access a previously connected external device through the screen mirroring preparation window 710 and view content that the external device provides. The display device 100 may provide an external input history window including information on an external device that is connected through an external input terminal such as an HDMI and information on a media content provided from an external device.

Figure 18A:
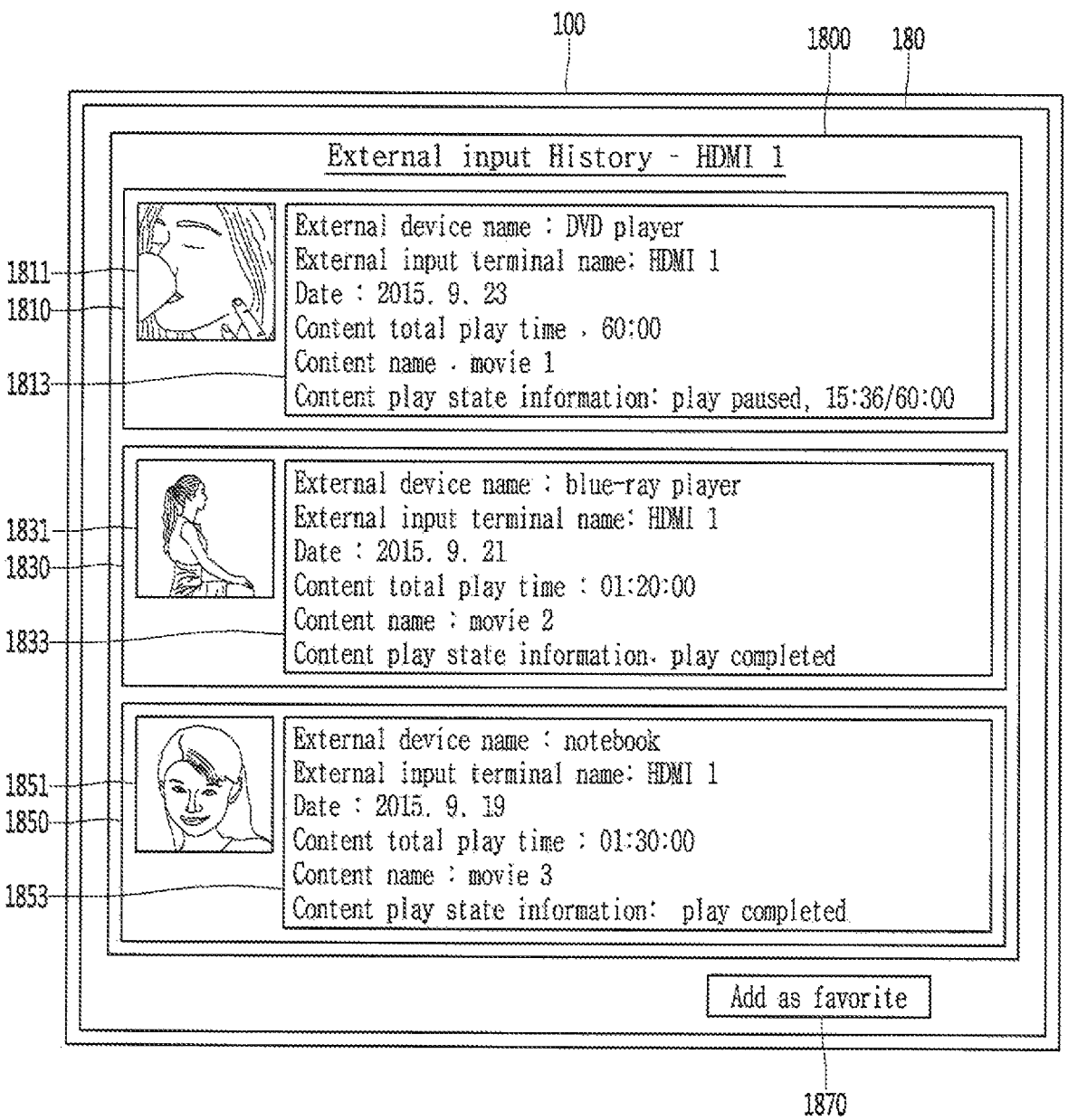
FIGS. 18A and 18B illustrate information on an external device that is previously connected to a display device through an external input terminal and information on a content provided through each external device in response to a request for providing an external input history.

If the second external input item 623 in FIG. 6 or 16 for a preset time is selected, the control unit 170, as shown in FIG. 18A, may display the external input history window 1800. The external input history window 1800 may provide Information of an external device that has previously been connected to the display device 100 through an external input terminal such as an HDMI to provide content and information. The external input history window 1800 may include a plurality of external input history items 1810, 1830, and 1850. The storage unit 140 may include the plurality of external input history items 1810, 1830, and 1850. Each external input history item may include information for identifying an external device and information on content that an external device transmits to the display device 100. The external device may be one of a DVD player, a Blu-ray player, and a notebook.

Information on an external device may include at least one of the name of the external device that has performed screen mirroring previously, an image for representing an external device, and a model of the external device. Information on content may include at least one of a content thumbnail image, a content name, content playback state information for representing a content playback state, a content total playback section, a content storage path, and a content access path.

The external input history window 1800 may further include a favorite add button 1870. The favorite add button 1870 may register at least one of the plurality of external input history items 1810, 1830, and 1850 as a favorite. If a specific external input history item is selected from the plurality of external input history items 1810, 1830, and 1850 and the favorite add button 1870 is selected, the control unit 170 may add the selected external input history item to a favorite list.

The plurality of external input history items 1810, 1830, and 1850 may be arranged according to the order of connecting to the display device 100. Referring to FIG. 18A, the first external input history item 910 may include a content thumbnail image 1811 that identifies content that a DVD player transmits to the display device 100 and content information 1813. The content thumbnail image 1811 may be a representative image to identify content but is not limited thereto, and may be an image corresponding to a specific time point of a content. The content Information 1813 may include at least one of the name (for example, a DVD player) of an external device that is connected to the display device 100, the name (for example, HDMI 1) of an external input terminal, a date (for example, 2015.9.23) of connecting to the display device 100, a content total playback section (for example, 60:00), a content name (for example, movie 1), and content playback state information. The content playback state information may include at least one of information on whether a content provided from a DVD player is played completely, whether content playback is stopped (or suspended), and whether content is played currently.

If content playback is stopped (or suspended), a text for representing that content playback is stopped (i.e., play paused) and a content playback stop time point (for example, 15:36/60:00) among a content total playback time may be included in content playback state information. The content playback stop time point may be a time point at which content playback is stopped according to a user input or a time point at which a connection between the display device 100 and the mobile terminal 300 is lost.

The second external input history item 1830 may include a content thumbnail image 1831 that identifies content that a Blu-ray player transmits to the display device 100 and content information 1833. The content thumbnail image 1831 may be a representative image to identify content but is not limited thereto, and may be an image corresponding to an image of content corresponding to a specific time point in the payback section of the content.

The content information 1833 may include at least one of the name (for example, a Blu-ray player) of an external device that is connected to the display device 100, a date (for example, 2015.9.21) of connecting to the display device 100, a content access path, a content total playback section (for example, 01:20:00), a content name (for example, movie 2), and content playback state information. Text for representing that content playback is completed (for example, play completed) may be included in content playback state information.

The third external input history item 1850 may include a content thumbnail image 1851 that identifies content that a notebook transmits to the display device 100 and content information 1853. The content information 1853 may include the name (for example, a notebook) of an external device that is connected to the display device 100 through an external input terminal, a date (for example, 2015.9.19) of connecting to the display device 100, a content total playback time (for example, 01:30:00), a content name (for example, movie 3), and content playback state information.

Only history information of an external input connected through an external input terminal corresponding to the second external input item 623 may be displayed. An external input history window may include information on all external devices that have been previously connected to external input terminals provided at the display device 100 and information on content provided from each external device. The plurality of external input history items 1810, 1830, and 1850 may respectively correspond to different external input terminals. In this case, an external device corresponding to each external input history item may be displayed differently according to whether it is connected to the current display device 100.

An external input history window including information on all external devices that have been previously connected to external input terminals provided at the display device 100 and information on content provided from each external device is described with reference to FIG. 18B. Additionally, the description for the drawing of FIG. 18B is used but only different contents are described.

Figure 18B:
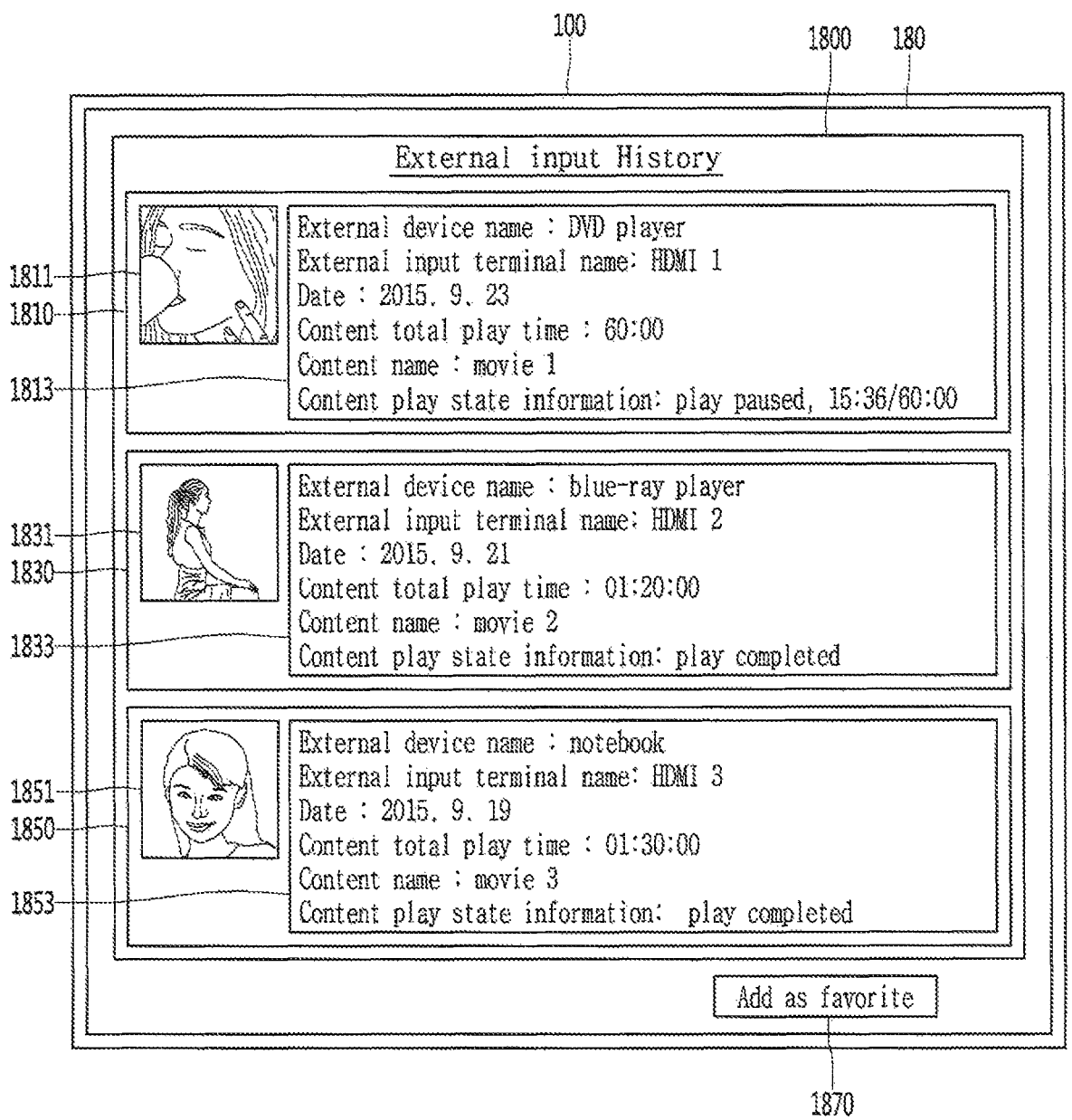

Referring to FIG. 18B, an external device (for example, a DVD player) corresponding to the first external input history item 1810 and an external device (for example, a Blu-ray player) corresponding to the second external input history item 1830 may not be connected to the current display device 100 but may be connected to the previous display device 100. The DVD player may be connected to an existing HDMI 1 terminal and the Blu-ray player may be connected to an existing HDMI 2 terminal.

Additionally, only an external device (for example, a notebook) corresponding to the third external input history item 1850 may be connected to the current display device 100. In this case, the control unit 170 may display the first external input history item 1810 and the second external input history item 1830 to be distinguished from the third external input history item 1850. For example, only the third external input history item 1850 may be highlighted and displayed.

An operating method of a display device may include displaying an external input list including a plurality of external input items; receiving a first request for selecting an external input item for screen mirroring from the plurality of external input items; and displaying a mirroring item including at least one of information on an external device that performs a screen mirroring function previously with the display device and information on a content provided through the external device according to the received first request.

A display device may include a display unit; a storage unit configured to store information on an external device that performs a screen mirroring function with the display device and information on a content provided through the external device; and a control unit configured to control the display unit to display an external input list including a plurality of external input items, receive a first request for selecting an external input item for screen mirroring from the plurality of external input items, and display a mirroring item including at least one of information on the external device and information on a content provided through the external device according to the received first request.

The information on the external device may include at least one of a name of the external device and an image for representing the external device. The information on the content may include at least one of a thumbnail image of the content, a name of the content, a date for performing the screen mirroring, playback state information of the content, source information for performing the content, and an access path of the content. The first request may include an input for selecting the external input item for a preset time.

The control unit may receive a second request for selecting the mirroring item and the display device may further include a short-range communication unit configured to request a transmission of a content that an external device corresponding to the selected mirroring item from the external device according to the received second request. The control unit may receive the content if the transmission of the content is permitted from the external device and plays the received content.

The control unit may play the content from a time point at which screen mirroring between the display device and the external device is stopped and a playback of the content is stopped. The control unit, if the transmission of the content is rejected from the external device, may display a message for representing that the transmission of the content is rejected.

The external input item may include information on an external device that performs screen mirroring function most recently with the display device and information on a content provided through an external device. The mirroring item may include a plurality of mirroring items and the control unit may distinguish and display a mirroring item corresponding to an external device that is currently connected to the display device from a mirroring item corresponding to an external device that is not currently connected to the display device among the plurality of mirroring items.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An operating method of a display device, the method comprising:
 displaying on the display device an external input list including a plurality of external input items;
 receiving a first request to select an external input item to perform a screen mirroring function from the plurality of external input items;
 displaying a first mirroring item, a second mirroring item, and a search button, wherein each of the first mirroring item and the second mirroring item includes at least one of information about an external device that has previously performed a screen mirroring with the display device and information about content provided through the external device according to the first request;

receiving a second request to select one of the first mirroring item or the second mirroring item; and when the external device corresponding to the selected mirroring item is not found in response to the second request, displaying an access path to obtain and play the content that has been provided through the screen mirroring by the external device, wherein the method further comprises searching for a first external device corresponding to the first mirroring item and a second external device corresponding to the second mirroring item when the search button is selected, and wherein when the first external device is found and the second external device is not found, the first mirroring item is distinguished from the second mirroring item on the display device, and wherein the information about the content includes a thumbnail image of the content, a name of the content, a time point that the screen mirroring was performed, playback state information of the content, and source information that provides the content.

2. The method according to claim 1, wherein the information about the external device includes at least one of a name of the external device and an image for representing the external device.

3. The method according to claim 1, further including:
requesting a transmission of content from the external device corresponding to the selected mirroring item according to the second request.

4. The method according to claim 3, further including:
receiving the content when the transmission of the content is permitted by the external device; and
playing the received content.

5. The method according to claim 4, wherein the playing of the received content includes playing the content from a time point at which screen mirroring between the display device and the external device was stopped during a previous screen mirroring, and a playback of the content is stopped.

6. The method according to claim 3, further including displaying a message for representing that the transmission of the content is rejected when the transmission of the content is rejected by the external device.

7. The method according to claim 1, wherein the external input item includes information on an external device that has most recently performed a screen mirroring function with the display device and information on content provided through the external device.

8. The method according to claim 1, wherein the first request and the second request are input through a remote controller.

9. The method according to claim 1, wherein the plurality of external input items comprises a high definition multimedia interface (HDMI) input, a component input, a plurality of external devices, and a tuner.

10. A display device comprising:
a display;
a short-range communication device configured to wirelessly communicate with an external device;
a memory configured to store information on an external device that performs a screen mirroring function with the display device and information on content provided through the external device; and
a controller configured to control the display, wherein the controller is further configured to:

display on the display device an external input list including a plurality of external input items, receive a first request to select an external input item for screen mirroring from the plurality of external input items, display a first mirroring item, a second mirroring item and a search button, wherein each of the first mirroring item and the second mirroring item includes at least one of information on the external device and information on content provided through the external device according to the first request, receive a second request to one of select the first mirroring item and the second mirroring item, and when the external device corresponding to the selected mirroring item is not found in response to the second request, display an access path to obtain and play the content that has been provided through the screen mirroring by the external device, wherein the controller is further configured to search for a first external device corresponding to the first mirroring item and a second external device corresponding to the second mirroring item when the search button is selected, and wherein when the first external device is found and the second external device is not found, the first mirroring item is distinguished from the second mirroring item on the display, and wherein the information about the content includes a thumbnail image of the content, a name of the content, a time point that the screen mirroring was performed, playback state information of the content, and source information that provides the content.

11. The display device according to claim 10, wherein the information on the external device includes at least one of a name of the external device and an image that represents the external device.

12. The display device according to claim 10, wherein the information on the content includes at least one of a thumbnail image of the content, a name of the content, a date of the screen mirroring, playback state information of the content, source information of the content, and an access path of the content.

13. The display device according to claim 10, wherein the short-range communication device is configured to request a transmission of content from the external device corresponding to the selected mirroring item according to the second request.

14. The display device according to claim 13, wherein the controller receives the content when the transmission of the content is permitted by the external device, and plays the received content.

15. The display device according to claim 14, wherein the controller plays the content from a time point at which screen mirroring between the display device and the external device was stopped during a previous screen mirroring, and a playback of the content is stopped.

16. The display device according to claim 13, wherein the controller displays a message that the transmission of the content is rejected when the transmission of the content is rejected by the external device.

17. The display device according to claim 10, wherein the external input item includes information on an external device that has most recently performed a screen mirroring function with the display device and information on content provided through the external device.

18. The display device according to claim 10, wherein the first request and the second request are input through a remote controller.

19. The display device according to claim 10, wherein the plurality of external input items comprises a high definition multimedia interface (HDMI) input, a component input, a plurality of external devices, and a tuner.

* * * * *